United States Patent
Pesce et al.

(10) Patent No.: US 10,622,937 B2
(45) Date of Patent: Apr. 14, 2020

(54) SPRING LATCH SADDLE CONNECTOR FOR SOLAR TRACKER

(71) Applicant: SolarCity Corporation, San Mateo, CA (US)

(72) Inventors: Kathryn Austin Pesce, San Francisco, CA (US); Charles Bernardo Almy, Berkeley, CA (US)

(73) Assignee: SolarCity Corporation, San Mateo, CA (US)

( * ) Notice: Subject to any disclaimer, the term of this patent is extended or adjusted under 35 U.S.C. 154(b) by 410 days.

(21) Appl. No.: 15/092,610

(22) Filed: Apr. 6, 2016

(65) Prior Publication Data
US 2017/0294867 A1     Oct. 12, 2017

(51) Int. Cl.
| | |
|---|---|
| H02S 20/30 | (2014.01) |
| F24S 30/425 | (2018.01) |
| F24S 25/65 | (2018.01) |
| H02S 20/32 | (2014.01) |
| F24S 25/60 | (2018.01) |
| F24S 25/00 | (2018.01) |

(52) U.S. Cl.
CPC ............. *H02S 20/30* (2014.12); *F24S 25/65* (2018.05); *F24S 30/425* (2018.05); *H02S 20/32* (2014.12); *F24S 2025/01* (2018.05); *F24S 2025/014* (2018.05); *F24S 2025/6003* (2018.05); *Y02E 10/47* (2013.01)

(58) Field of Classification Search
CPC ........... H02S 20/32; H02S 30/10; H02S 20/30
USPC .................................................. 136/243–265
See application file for complete search history.

(56) References Cited

U.S. PATENT DOCUMENTS

| | | |
|---|---|---|
| 4,498,822 A | 2/1985 | Diba |
| 6,809,251 B2 | 10/2004 | Dinwoodie |
| 7,647,924 B2 | 1/2010 | Hayden |
| 7,832,157 B2 | 11/2010 | Cinnamon |
| 8,109,393 B2 | 2/2012 | Haeberlein |
| 8,371,076 B2 | 2/2013 | Jones et al. |

(Continued)

FOREIGN PATENT DOCUMENTS

| | | |
|---|---|---|
| CN | 201000241 Y | 1/2008 |
| DE | 19601069 A1 | 4/1997 |

(Continued)

OTHER PUBLICATIONS

First Action Interview Pilot Program Pre-Interview Communication dated May 23, 2018 in U.S. Appl. No. 15/092,602, filed Apr. 6, 2016. 4 pages.

(Continued)

*Primary Examiner* — Dustin Q Dam
(74) *Attorney, Agent, or Firm* — Dentons US LLP

(57) ABSTRACT

Photovoltaic modules are mounted onto a solar tracker array torque tube via pairs or left-handed and right-handed photovoltaic array connectors having spring latch assemblies. The left-handed and right-handed photovoltaic array connectors have orientation projections that couple with and extend into the interior body of the torque tube. The orientation projections on the spring latch assemblies of each pair of left-handed and right-handed photovoltaic array connector allow for the photovoltaic array connectors to fit over and settle on a torque tube, and thereby support and mount a photovoltaic module as part of a solar tracker array.

14 Claims, 11 Drawing Sheets

(56) References Cited

U.S. PATENT DOCUMENTS

| | | |
|---|---|---|
| 8,567,134 B1 | 10/2013 | Grushkowitz et al. |
| 8,650,813 B2 | 2/2014 | Botkin et al. |
| 8,757,567 B2 | 6/2014 | Ciasulli et al. |
| 8,813,460 B2 * | 8/2014 | Cinnamon ............. H02S 30/10 52/747.1 |
| 8,822,812 B2 | 9/2014 | Wares |
| 8,839,784 B2 | 9/2014 | Wares et al. |
| 8,881,415 B2 | 11/2014 | Barton |
| 8,887,920 B2 | 11/2014 | Pelman et al. |
| 9,172,325 B2 | 10/2015 | Klinga et al. |
| 9,184,324 B2 | 11/2015 | Wares et al. |
| 9,263,985 B2 | 2/2016 | Silberschatz et al. |
| 9,281,778 B2 | 3/2016 | Corio et al. |
| 2004/0140002 A1 | 7/2004 | Brown et al. |
| 2006/0005875 A1 | 1/2006 | Haberlein |
| 2006/0032527 A1 | 2/2006 | Stevens et al. |
| 2010/0089390 A1 | 4/2010 | Miros et al. |
| 2010/0313499 A1 | 12/2010 | Gangemi |
| 2011/0290307 A1 | 12/2011 | Workman et al. |
| 2012/0180845 A1 | 7/2012 | Cole et al. |
| 2012/0233940 A1 | 9/2012 | Perkins et al. |
| 2014/0246549 A1 * | 9/2014 | West ....................... H02S 20/30 248/220.22 |
| 2014/0261626 A1 | 9/2014 | Ripoll Agullo |
| 2014/0270930 A1 | 9/2014 | Grushkowitz |
| 2014/0318605 A1 | 10/2014 | Huzyak et al. |
| 2014/0360552 A1 | 12/2014 | Britcher et al. |
| 2015/0101996 A1 | 4/2015 | Nayar |
| 2015/0104239 A1 | 4/2015 | Schaefer et al. |

FOREIGN PATENT DOCUMENTS

| | | | |
|---|---|---|---|
| DE | 29908190 U1 | 8/1999 | |
| DE | 10336145 A1 | 3/2005 | |
| DE | 102004049595 B3 | 3/2006 | |
| DE | 102010005194 A1 | 9/2010 | |
| DE | 102012202256 A1 | 5/2013 | |
| DE | 202013005668 U1 | 10/2014 | |
| EP | 2549198 B1 | 12/2013 | |
| JP | 2006278738 A * | 10/2006 | ............ F24J 2/5205 |
| JP | 2006278738 A | 10/2006 | |
| WO | 2015024542 A1 | 2/2015 | |

OTHER PUBLICATIONS

First Action Interview Pilot Program Pre-Interview Communication dated Jul. 12, 2018 in U.S. Appl. No. 15/094,887, filed Apr. 8, 2016. 4 pages.

First Action Interview Office Action Summary dated Nov. 19, 2018 in U.S. Appl. No. 15/092,602, filed Apr. 6, 2016. 22 pages.

Final Office Action dated Jul. 11, 2019 in U.S. Appl. No. 15/092,602, filed Apr. 6, 2016. 24 pages.

* cited by examiner

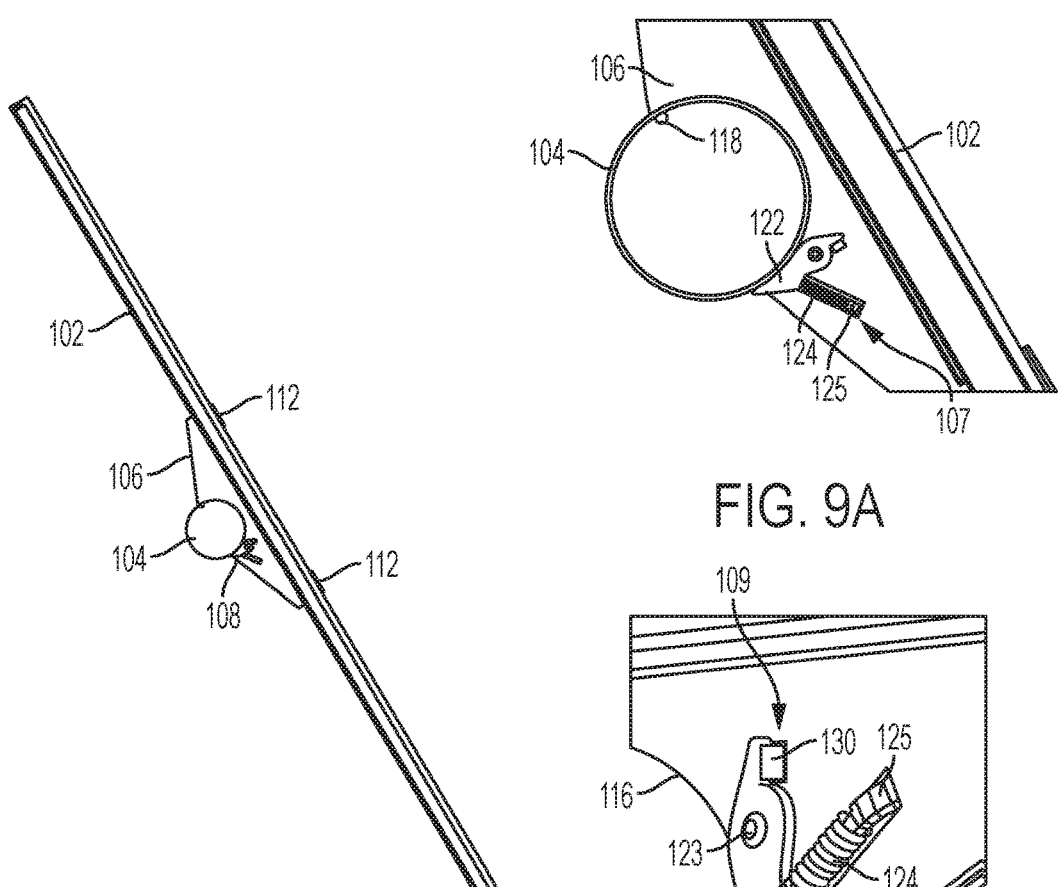
FIG. 9
FIG. 9A
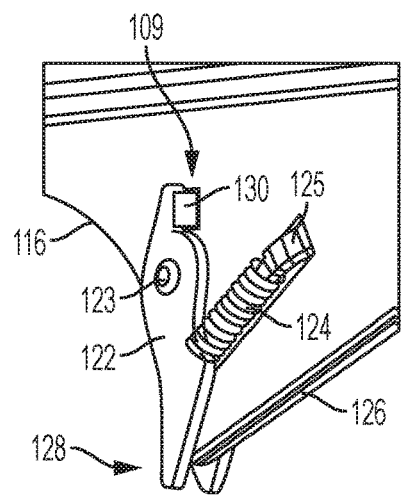
FIG. 9B
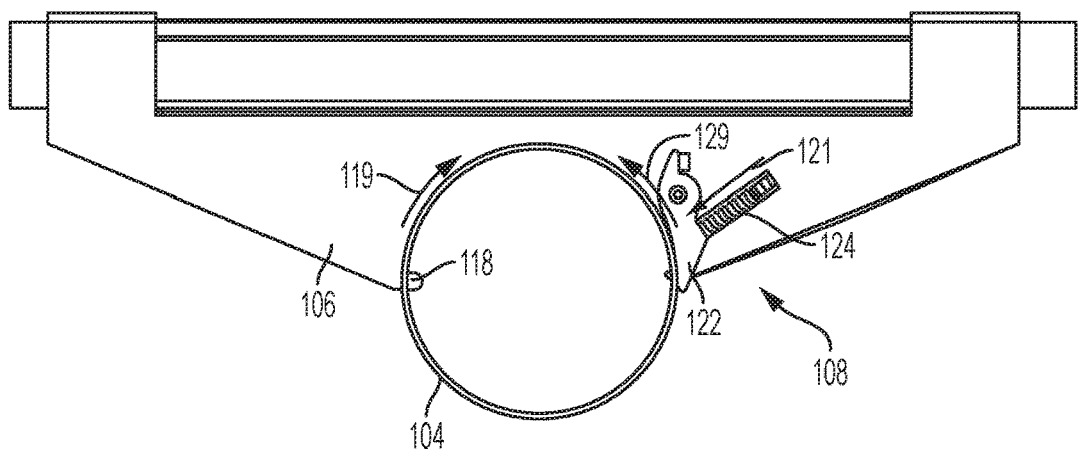
FIG. 9C

SPRING LATCH SADDLE CONNECTOR FOR SOLAR TRACKER

TECHNICAL FIELD

The present invention relates to photovoltaic modules and photovoltaic tracker arrays assembled therefrom.

BACKGROUND OF THE INVENTION

Solar trackers are used to rotate photovoltaic (PV) modules to keep them perpendicular to the direct rays of the sun. Keeping the PV modules, as part of an array, at this orientation increases or optimizes the amount of energy that can be generated by the array, because energy generated by the array drops off with the cosine of the angle of incidence of solar rays on the surface of the array. Because they are usually ground mounted and require row-to-row spacing, trackers are typically used in medium to large sized arrays (e.g., ≥1 megawatt). Although trackers add an additional cost per watt over fixed ground-mount systems, the cost is typically recouped on larger arrays.

In a single-axis tracker, photovoltaic modules are suspended above the ground in one or more horizontal rows, connected to a beam known as a torque tube. The torque tube, generally oriented along a North-South axis, is attached to a drive mechanism actuated by a controller to incrementally rotate the photovoltaic array in place over the course of the day to maintain a relatively constant angle with the sun as the sun progresses through the sky.

Some more sophisticated trackers known as dual-axis trackers not only rotate modules from East-to-West but also tilt modules towards the equator. With these trackers, modules are usually clustered together in individual sections, spaced apart from one another since they have to have greater spacing due to intra-row shading (shading of one section by an adjacent section in the same row), as well as inter-row shading (shading of one row by the adjacent row).

Because tracker arrays require very little post installation maintenance, the viability of these projects often turns on the projected rate of return derived from comparing the fixed value of the energy generated over the lifetime of the system versus the upfront costs of installation. In a multi-megawatt project, cost reductions of pennies per watt can be the difference between a project being viable or too expensive. Therefore, tracker designers are always seeking innovations to lower installation and hardware costs.

Accordingly, there remains a need for photovoltaic module assembly hardware that can make installation of solar tracker arrays more efficient and cost effective.

BRIEF SUMMARY OF THE INVENTION

The present disclosure provides for photovoltaic module connectors having spring latch assemblies, where pairs of the photovoltaic module connectors positioned on opposing sides of a photovoltaic module, can support and be used to mount the photovoltaic module to a torque tube as part of a solar tracker array, or section thereof. The photovoltaic module connectors can mechanically secure to the torque tube by alignment structures on either side of a collar of the photovoltaic module connectors fitting into openings in the torque tube. The alignment structures can be static or rigid on one side of the photovoltaic module connector, and adjustable or dynamic as part of the latch assembly on the opposing side of the photovoltaic module connector. In some aspects, the photovoltaic module connectors can have a handedness (e.g., left-handed, right-handed), and be connected to photovoltaic modules as left side and right side supports for a photovoltaic module. In other aspects, the photovoltaic module connectors can be universal, without a particular handedness, where the photovoltaic module connectors can have structural support for photovoltaic modules on either side of the photovoltaic module connector, or can be configured to have photovoltaic modules bolted to a region of an individual photovoltaic module connector.

In some embodiments, the present disclosure provides for a photovoltaic array section assembled from a plurality of photovoltaic modules being attached to a torque tube via the photovoltaic module connectors discussed herein.

Various embodiments of the present disclosure provide new and improved methods and systems for attaching solar panels to a torque tube of a solar tracker. Various embodiments will reduce costs and increase installation speed over conventional methods and systems. These and other embodiments are shown and discussed in greater detail in the drawing figures and corresponding detailed description.

BRIEF DESCRIPTION OF THE DRAWINGS

Illustrative aspects of the present disclosure are described in detail below with reference to the following drawing figures. It is intended that that embodiments and figures disclosed herein are to be considered illustrative rather than restrictive.

FIG. 9 shows a profile view of a photovoltaic module connector attached to a photovoltaic module and engaged with a torque tube, according to embodiments of the disclosure.

FIG. 9A shows a detail section of FIG. 9, further illustrating a spring latch of the photovoltaic module connector, according to aspects of the disclosure.

FIG. 9B shows a detail section of FIG. 9, further illustrating a perspective view of the spring latch of the photovoltaic module connector, according to aspects of the disclosure.

FIG. 9C further shows preload forces exerted by a photovoltaic module connector as mounted onto a torque tube, according to some embodiments of the present disclosure.

DETAILED DESCRIPTION OF THE INVENTION

Figure 1:
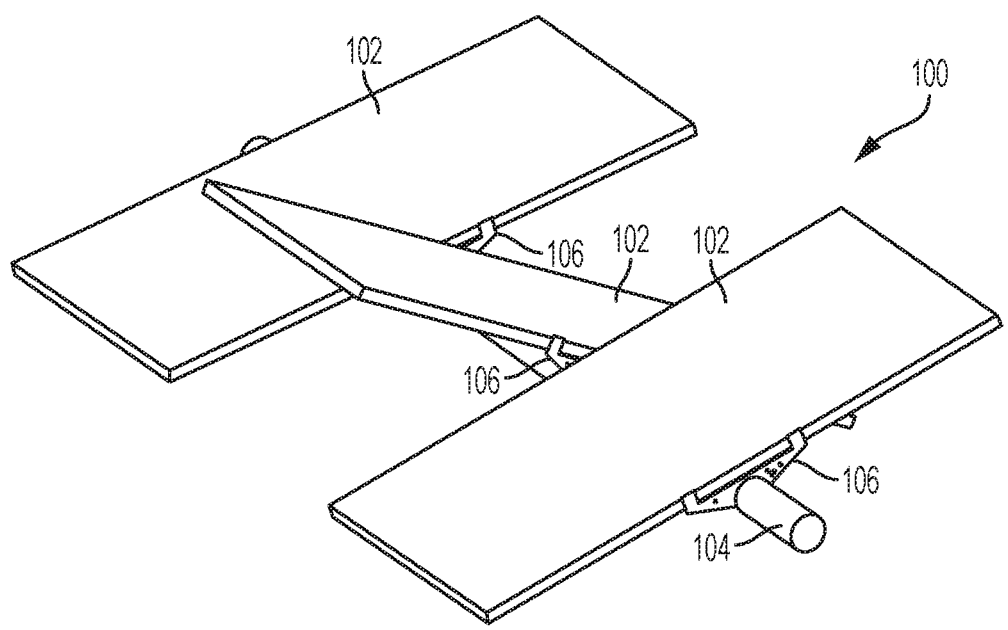
FIG. 1 shows a section of a photovoltaic array with photovoltaic modules mounted to a torque tube with photovoltaic module connectors, according to embodiments of the disclosure.

Throughout this description for the purposes of explanation, numerous specific details are set forth in order to provide a thorough understanding of the many aspects and embodiments disclosed herein. It will be apparent, however, to one skilled in the art that the many aspects and embodiments may be practiced without some of these specific details. In other instances, known structures and devices are shown in diagram or schematic form to avoid obscuring the underlying principles of the described aspects and embodiments.

Solar arrays that track the daily movement of the sun typically include of one or more rows of photovoltaic (PV) modules (e.g., solar panels) that are attached to contiguous sections of pipe, referred to singularly or collectively as a torque tube. Spacing between rows is necessary to allow the modules to freely rotate and also to prevent inter-row shading (e.g., row-to-row shading). A drive motor then rotates the torque tube in accordance with a predetermined algorithm to keep the solar panels attached to the tube "on sun"—in other words, relatively perpendicular to direct solar radiation. This algorithm will vary depending on the latitude of the installation. These types of solar trackers are referred to single axis trackers. There may be a drive motor on each torque tube, or alternatively a common drive assembly that interconnects multiple torque tubes to rotate them simultaneously.

Mounting photovoltaic modules to torque tubes of solar tracker arrays can be time consuming and require specialized or heavy equipment. The present disclosure contemplates a system and set of photovoltaic modules that allows for connecting photovoltaic modules to torque tubes with photovoltaic mounting connectors (alternatively referred to as mounts) that have a spring latch assembly, avoiding the need for individual riveting, fastening, or use of other hardware to further secure photovoltaic modules to a torque tube. Operation of the spring latch assembly can be done manually or with the aid of a hand-tool.

Earlier approaches to mounting photovoltaic modules to a torque tube by use of tab or projection structures alone led to problems with excessive shear force on the extended structures. As seen herein, the attachment structures of photovoltaic modules and their respective tab or projection structures distributes the load and sheer force on either side of the torque tube and avoids physical conflict zones. Moreover, the weight of each photovoltaic module can be used to help enable the adjustable, spring latch assemblies to engage with receiving apertures in the torque tube. In other words, as a photovoltaic module is being mounted on the torque tube, the interface between the photovoltaic module and torque tube can act as a fulcrum, where the portion of the photovoltaic module on the side of the torque tube opposite an installer acts as a load arm. The photovoltaic module thereby applies a downward force in the direction of the opposite side from the installer, until the adjustable structures of the spring latch assemblies self-insert into corresponding holes on the respective side of the torque tube.

As further seen herein, photovoltaic module connectors, and the attachment tabs of those photovoltaic module connectors fit into holes of a torque tube, and exert a restoring spring-like force when fit and stretched over the exterior surface of a torque tube. By pairing photovoltaic module connectors, with respective attachment tabs in receiving holes of opposite sides of a torque tube, the restoring forces and tension created by the photovoltaic module connectors is offset and balanced, stabilizing the photovoltaic modules mounted as part of an array.

As used herein, the terms "right-hand" and "left-hand" refer to the orientation of PV module connecters as attached to a given PV module. In the context of the present disclosure, the difference between left-handed and right-handed versions of a PV module connector will typically be the orientation of an alignment projection formed as part of the PV module connector. Generally, a right-handed connector connects to one side of a first PV module, while a left-handed connector connects to the opposing side of the same PV module. The right and left handed connectors are not necessarily identical or interchangeable, but can have many mirrored elements. A right-handed connector can have various aspects that mirror similar or identical aspects of a left-handed connector, as defined by a mirroring plane that is transverse to an axis that defines the elongation of a torque tube. Hence, a right-handed connector can be configured for mounting to only a first side of a PV module, while a left-handed connector can be suitable for only mounting to a second side of the PV module that opposes the first side. This naming convention is for ease of reference, as it can be understood that the order in which PV modules are assembled or mounted, or the decision to identify one end of a PV module as the top, head, or leading end versus another, is contextual.

FIG. 1 shows photovoltaic array section 100 with photovoltaic modules 102 mounted to torque tube 104 with photovoltaic (PV) module connectors 106. In particular, FIG. 1 shows photovoltaic array section 100 at an intermediate stage of assembly and installation, where photovoltaic modules 102 are not yet settled into a substantially even and uniform plane. Torque tube 104 (alternatively referred to as a pipe or a support bar) has a circular shape. In other embodiments, torque tube 104 can have a square, rectangular, triangular, hexagonal, octagonal, or other cross-sectional shape. Photovoltaic modules 102 are generally rectangular, having a long edge and a short edge, and as considered herein, photovoltaic modules 102 can be rectangular modules as known in the industry, including but not limited to, 60-cell PV modules, 72-cell PV modules, 80-cell PV modules, 96-cell PV modules, and the like. Generally, for any given photovoltaic array section 100, photovoltaic modules 102 will be the same size, operate at the same voltage, and generate the same amount of power, such that no individual photovoltaic module 102 of photovoltaic array section 100 becomes an operational drag on other photovoltaic modules 102.

Photovoltaic modules 102 are each secured to torque tube 104 via PV module connectors 106, using both right-handed PV module connectors and left-hand module connectors. PV module connectors 106 can mechanically attach to opposing long edges of photovoltaic modules 102. Further, PV module connectors 106 can be shaped to have a cut-out region that can mechanically match with and couple to an exterior profile and shape of torque tube 104. PV module connectors 106, alternatively referred to as a "saddle brackets," allow for photovoltaic modules 102 to balance on and secure to torque tube 104. Moreover, PV module connectors 106 have an inward surface, configured to face and connect to photovoltaic modules 102, and an outward surface on the opposite side from the respective inward surface.

In some embodiments, first PV module connector 106 and second PV module connector 106 can be used to support photovoltaic module 102, where each of first PV module connector 106 and second PV module connector 106 have the same configuration. In such aspects, both first PV module connector 106 and second PV module connector 106 can be symmetrical along a vertical axis of each PV module connector 106. In other words, each PV module connector 106 can have elements for supporting photovoltaic module 102 extending equally from both interior and exterior surfaces of PV module connector 106, or each PV module connector 106 can be flush without elements for supporting photovoltaic module 102 extending outward but rather with openings or apertures for receiving fastening hardware.

As part of photovoltaic array section 100, photovoltaic modules 102 can further include junction boxes connected to the cells of each photovoltaic module 102 to relay the solar energy collected by the photovoltaic cells.

PV module connectors 106 can be constructed from materials appropriate for use with photovoltaic array section 100 and photovoltaic modules 102. Accordingly, PV module connectors 106 can be constructed from lightweight construction materials including, but not limited to, stainless steel, aluminum, titanium, other metals, and alloys or intermetallics thereof. In various embodiments, PV module connectors 106 can each be formed out of a single piece of sheet metal that is stamped and bent into an appropriate shape. In alternative embodiments, PV module connectors 106 can also be fabricated from roll-formed metal, casting, or other such process. PV module connectors 106 can be designed and constructed to withstand upwards of 305 lbs. of upforce (e.g. from torque tube 104) and 375 lbs. of downforce (e.g. from photovoltaic module 102).

Figures 2A, 2B:
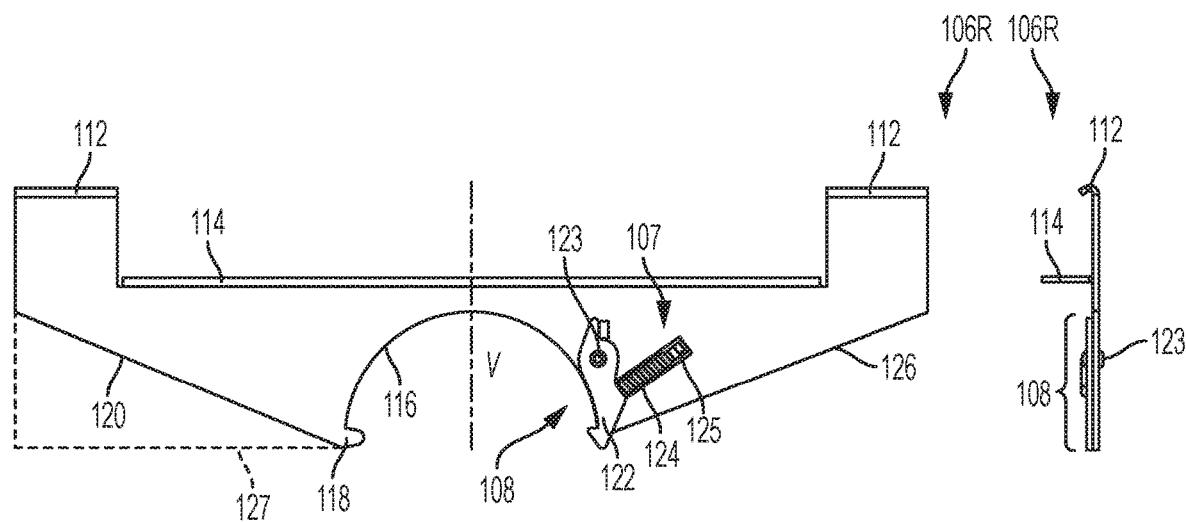
FIG. 2A shows a profile view of a right-handed photovoltaic module connector, according to aspects of the disclosure.
FIG. 2B shows a side view of a right-handed photovoltaic module connector, according to aspects of the disclosure.
Figures 2C, 2D:
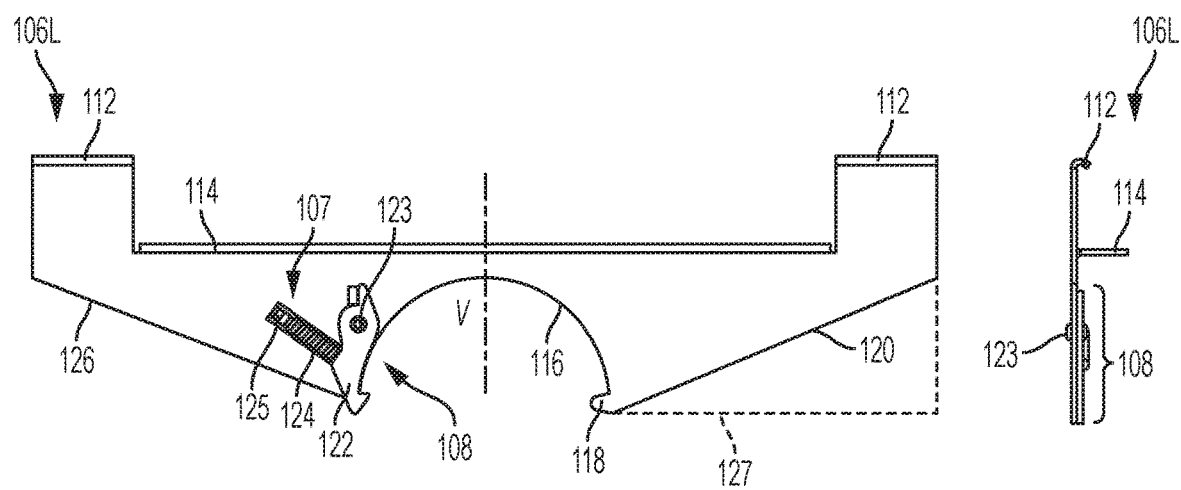
FIG. 2C shows a profile view of a left-handed photovoltaic module connector, according to aspects of the disclosure.
FIG. 2D shows a side view of a left-handed photovoltaic module connector, according to aspects of the disclosure.

FIGS. 2A and 2B show an exemplary embodiment of right-handed PV module connector 106R, while FIGS. 2C and 2D show an exemplary embodiment of left-handed PV module connector 106L. It can be understood that aspects of both right-handed PV module connector 106R and left-handed PV module connector 106L can be referred to in the general context of PV module connectors 106, and vice versa.

FIG. 2A shows a profile view of right-handed PV module connector 106R. Right-handed PV module connector 106R can have a main body constructed to couple with and conform to components of photovoltaic array section 100. As shown, right-handed PV module connector 106R includes curved arm 112 sections and ledge section 114 that extend from the inward surface of right-handed PV module connector 106R. Curved arm sections 112 (alternatively referred to as "clamping curves" or "saddle clamps") can be located at opposite ends of right-handed PV module connector 106R with ledge section 114 in between. Ledge section 114 can be alternatively referred to as a platform, a lateral support, or an inward support member. Curved arm sections 112 can be relatively higher than ledge section 114 along the height of right-handed PV module connector 106R. In alternative aspects, curved arm sections 112 can be located more proximate toward the center of the length of right-handed PV module connector 106R, and right-handed PV module connector 106R can include a plurality of ledge sections 114 on one or either side of curved arm sections 112.

Both right-handed PV module connectors 106R and left-hand module connectors 106L can further include alignment projections 118 (alternatively referred to as orientation or attachment projections, hooks, or tabs) that provide for structural elements that can couple with holes in torque tube 104, thereby stabilizing photovoltaic modules 102 mounted to torque tube 104 via right-hand PV module connector 106R and left-hand module connector 106L.

Below ledge section 114 formed in the main body of right-handed PV module connector 106R, is collar edge 116. As shown, collar edge 116 is faceted, however, it make take on other geometries. Collar edge 116 can be cut, cast, bent, or otherwise formed into the main body of right-handed PV module connector 106R to match with the shape of the exterior surface of torque tube 104. For example, where torque tube 104 is circular (forming a cylinder), collar edge 116 can have a semi-circular shape. The shape of collar edge 116 of any given PV module connector 106 can correspond to the shape of torque tube 104. One end of collar edge 116 can have alignment projection 118, where alignment projection 118 is arranged to extend relatively toward a central vertical axis V of right-handed PV module connector 106R, or in other words, toward the opposite end of collar edge 116.

Alignment projection 118 can be angled to point relatively toward, parallel to, or away from ledge section 114. Further, alignment projection 118 can extend a distance from the main body of right-handed PV module connector 106R about one quarter of an inch (¼ in.), or about less than or equal to five percent ($\leq 5\%$) of the width or diameter of collar edge 116. Alignment projection 118 can be formed from the main body of right-handed PV module connector 106R, being made of the same material. Alignment projection 118 can further be a reinforced structure, where in some aspects alignment projection 118 can be about twice as thick as the remainder of the main body of right-handed PV module connector 106R. The thickness of alignment projection 118 can be increased by adding material to the width of alignment projection 118 relative to the main body of right-handed PV module connector 106R, for example by doubling the amount of metal and/or alloy used for alignment projection 118, and thereby proportionally increasing the strength of alignment projection 118 relative to the main body of right-handed PV module connector 106R. In alternative aspects, the structure of alignment projection 118 can be reinforced with an additional amount of material attached (e.g. welded) onto the main body of right-handed PV module connector 106R, where the additional material can be the same or a different metal or alloy as right-handed PV module connector. Alignment projection 118 can be configured to couple with receiving holes in torque tube 104, discussed in further detail below.

Right-handed PV module connector 106R can further include first edge 120 (alternatively referred to as a leading edge or primary ramp), defining in part a lower edge of the main body of right-handed PV module connector 106, on the same side as alignment projection 118 relative to collar edge 116. Similarly, right-handed PV module connector 106R can further include second edge 126 (alternatively referred to as a trailing edge or a secondary ramp), defining in part a lower edge of the main body of right-handed PV module connector 106R, on the opposite side as alignment projection 118 relative to collar edge 116.

Each of first edge 120 and second edge 126 can have an angle relative to ledge section 114 (or in other words, relative to the horizontal plane on which photovoltaic module 102 rests when coupled to right-handed PV module connector 106) that is from about five degrees to about sixty degrees ($\theta=5°-60°$). This angle for either of first edge 120 and second edge 126 can be in part determined by the length of right-handed PV module connector 106R, and can further in part be determined by the amount of structural support needed for various photovoltaic modules 102 (e.g. photovoltaic modules 102 having different numbers of photovoltaic cells, weights, and/or lengths). Further, in some embodiments, second edge 126 does not necessarily need to have a particular angle relative to ledge section 114, but rather can be squared-off section 127 of right-handed PV module connector 106R, or in other words, the section of right-handed PV module connector 106R below trailing aperture 124 can be rectangular in shape (represented as an example, as a dotted line).

Right-handed PV module connector 106R can further include latch assembly 108, positioned along collar edge 116 on a side opposite of alignment projection 118. Latch assembly 108 can include pawl 122 and spring 124, where spring 124 is connected to right-handed PV module connector 106R via anchor 125, and where spring 124 exerts a force on pawl 122 urging pawl 122 toward a central vertical axis V of right-handed PV module connector 106R, or in other words, toward the opposite end of collar edge 116. The main body of right-handed PV module connector 106R can be in part cut or formed to accommodate the shape of latch assembly 108 such that latch assembly 108 in part forms a generally continuous surface along with collar edge 116. Pawl 122 can be pivotally coupled to right-handed PV module connector 106R by headed pin 123 that passes through the main body of right-handed PV module connector 106R. Headed pin 123 can be sufficiently loose or have enough play such that pawl 122 can easily rotate around an axis of rotation defined by headed pin 123, the axis of rotation being perpendicular to the general shape of the main body of right-handed PV module connector 106R.

Pawl 122 of right-handed PV module connector 106R can be made of the same material or a different material as the main body of right-handed PV module connector 106R. In some aspects, pawl 122 can be constructed from a relatively stronger or harder metal or alloy than used for the main body of right-handed PV module connector 106R. Pawl 122 can be positioned on the interior side of right-handed PV module connector 106R, or in other words, on the side of right-handed PV module connector 106R configured to face and support photovoltaic module 102.

Spring 124 of right-handed PV module connector 106R can be disposed within retracting region 107 of right-handed PV module connector 106R. Retracting region 107 can be sized and shaped to accommodate spring 124 and anchor 125 that mechanically connect spring 124 o the main body of right-handed PV module connector 106R. Spring 124 can be a coil-spring as shown, or any other type of spring that can fit within retracting region 107 and apply a force on pawl 122. Retracting region 107 further provides space for pawl 108 to rotate or pivot in a direction away from a central vertical axis V of right-handed PV module connector 106R.

The length of right-handed PV module connector 106R, in some embodiments, can be from about two hundred millimeters to about one thousand millimeters (200 mm-1000 mm), or a length of any increment or gradient thereof. The length of right-handed PV module connector 106R, in some particular embodiments, can be about four hundred millimeters (400 mm).

FIG. 2B shows a side view of right-handed PV module connector 106R. The extent to which curved arm 112 and ledge 114 generally extend from the inward surface of right-handed PV module connector 106R can be further appreciated in FIG. 2B. In various aspects of right-handed PV module connector 106R, either of curved arm 112 and ledge 114 can extend from about one inch to about twelve inches (1 in.-12 in.) from the inward surface of right-handed PV module connector 106R, or a length of any increment or gradient thereof. Further, latch assembly 108 can be seen alongside and increasing the lower-portion thickness of right-handed PV module connector 106R.

FIG. 2C shows a profile view of left-handed photovoltaic module connector 106L, which, similarly to right-handed PV module connector 106R, can have a main body constructed to couple with and conform to components of photovoltaic array section 100. Left-handed PV module connector 106L includes curved arm 112 sections and ledge section 114 that extend from the inward surface of left-handed PV module connector 106L. Curved arm sections 112 can be located at opposite ends of left-handed PV module connector 106L with ledge section 114 in between. Curved arm sections 112 can be relatively higher than ledge section 114 along the height of left-handed PV module connector 106L. In alternative aspects, curved arm sections 112 can be located more proximate toward the center of the length of left-handed PV module connector 106L, and left-handed PV module connector 106L can include a plurality of ledge sections 114 on one or either side of curved arm sections 112. Further, for any given photovoltaic module 102, right-handed PV module connector 106R and left-handed PV module connector 106L mechanically coupled to photovoltaic module 102 can have curved arms 112 and ledges 114 that mirror each other (having the same number and arrangement of curved arms 112 and ledges 114) on opposing sides of photovoltaic module 102.

Below ledge section 114, formed in the main body of left-handed PV module connector 106L, is collar edge 116. Collar edge 116 can be cut, cast, bent, or otherwise formed into the main body of left-handed PV module connector 106L to match with the shape of the exterior surface of torque tube 104, and accordingly can have the same shape as collar edge 116 of right-handed PV module connector 106R. One end of collar edge 116 can have alignment projection 118, where alignment projection 118 is arranged to extend relatively toward a central vertical axis V of left-handed PV module connector 106L, or in other words, toward the opposite end of collar edge 116.

Similar to right-handed PV module connector 106R, alignment projection 118 of left-handed PV module connector 106L can be angled to point relatively toward, parallel to, or away from ledge section 114. Alignment projection 118 can extend a distance from the main body of left-handed PV module connector 106L about one quarter of an inch (¼ in.), or about less than or equal to five percent (≤5%) of the width or diameter of collar edge 116. Alignment projection 118 can be formed from the main body of left-handed PV module connector 106L, being made of the same material. Alignment projection 118 can further be a reinforced structure, where in some aspects alignment projection 118 can be about twice as thick as the remainder of the main body of left-handed PV module connector 106L. The thickness of alignment projection 118 can be increased by adding material to the width of alignment projection 118 relative to the main body of left-handed PV module connector 106L, for example by doubling the amount of metal and/or alloy used for alignment projection 118, and thereby proportionally increasing the strength of alignment projection 118 relative to the main body of left-handed PV module connector 106L. In alternative aspects, the structure of alignment projection 118 can be reinforced with an additional amount of material attached (e.g. welded) onto the main body of left-handed PV module connector 106L, where the additional material can be the same or a different metal or alloy as right-handed PV module connector. Further, alignment projection 118 can be configured to couple with receiving holes in torque tube 104. In various aspects, alignment projections 118 on right-handed PV module connector 106R and left-handed PV module connectors 106L can be of the same or different construction and/or thicknesses.

Again mirroring right-handed PV module connector 106R, left-handed PV module connector 106L can further include first edge 120, defining a lower edge of the main body of left-handed PV module connector 106L, on the same side as alignment projection 118 relative to collar edge 116. Left-handed PV module connector 106L can further include second edge 126, defining in part a lower edge of the main body of left-handed PV module connector 106L, on the opposite side as alignment projection 118 relative to collar edge 116.

Each of first edge 120 and second edge 126 can have an angle relative to ledge section 114 (or in other words, relative to the horizontal plane on which photovoltaic module 102 rests when coupled to left-handed PV module connector 106L) that is from about five degrees to about sixty degrees (θ=5°-60°). This angle for either of first edge 120 and second edge 126 can be in part determined by the length of left-handed PV module connector 106L, and can further in part be determined by the amount of structural support needed for various photovoltaic modules 102 (e.g. photovoltaic modules 102 having different numbers of photovoltaic cells, weights, and/or lengths). Further, in some embodiments, second edge 126 does not necessarily need to have a particular angle relative to ledge section 114, but rather can be a squared-off section of left-handed PV module connector 106L, or in other words, the section of left-handed PV module connector 106L below trailing aperture 124 can be rectangular in shape. In some embodiments of photovoltaic module 102 connected to torque tube 104 as part of photovoltaic array section 100, either one of right-handed PV module connector 106R and left-handed PV module connector 106L can have second edge 126 as an angled ramp while second edge 126 of the other PV module connector can have a rectangular structure such as squared-off section 127 in lieu of second edge 126.

Left-handed PV module connector 106L can further include latch assembly 108, positioned along collar edge 116 on a side opposite of alignment projection 118. Latch assembly 108 can include pawl 122 and spring 124, where spring 124 is connected to left-handed PV module connector 106L via anchor 125, and where spring 124 exerts a force on pawl 122 urging pawl 122 toward a central vertical axis V of left-handed PV module connector 106L, or in other words, toward the opposite end of collar edge 116. The main body of left-handed PV module connector 106L can be in part cut or formed to accommodate the shape of latch assembly 108 such that latch assembly 108 in part forms a generally continuous surface along with collar edge 116. Pawl 122 can be pivotally coupled to left-handed PV module connector 106L by headed pin 123 that passes through the main body of left-handed PV module connector 106L. Headed pin 123 can be sufficiently loose or have enough play such that pawl 122 can easily rotate around an axis of rotation defined by headed pin 123, the axis of rotation perpendicular to the general shape of the main body of left-handed PV module connector 106L.

Pawl 122 of left-handed PV module connector 106L can be made of the same material or a different material as the main body of left-handed PV module connector 106L. In some aspects, pawl 122 can be constructed from a relatively stronger or harder metal or alloy than used for the main body of left-handed PV module connector 106L. Pawl 122 can be positioned on the interior side of left-handed PV module connector 106L, or in other words, on the side of left-handed PV module connector 106L configured to face and support photovoltaic module 102. In various aspects, pawl 122 that is a member of left-handed PV module connector 106L can be constructed from a metal or alloy that is as strong, stronger than, or not as strong as pawl 122 that is a member of right-handed PV module connector 106R.

Spring 124 of left-handed PV module connector 106L can be disposed within retracting region 107 of left-handed PV module connector 106L. Retracting region 107 can be sized and shaped to accommodate spring 124 and anchor 125 that mechanically connect spring 124 to the main body of left-handed PV module connector 106L. Spring 124 can be a coil-spring as shown, or any other type of spring that can fit within retracting region 107 and apply a force on pawl 122. Retracting region 107 further provides space for pawl 108 to rotate or pivot in a direction away from a central vertical axis V of left-handed PV module connector 106L.

The length of left-handed PV module connector 106L, in some embodiments, can be from about two hundred millimeters to about one thousand millimeters (200 mm-1000 mm), or a length of any increment or gradient thereof. The length of left-handed PV module connector 106L, in some particular embodiments, can be about four hundred millimeters (400 mm). In various embodiments, right-handed PV module connectors 106R and left-handed PV module connectors 106L can be of the same or different lengths on any given photovoltaic module 102, or plurality of photovoltaic modules 102 as part of photovoltaic array section 100.

FIG. 2D shows a side view of left-handed PV module connector 106L. The extent to which curved arm 112 and ledge 114 generally extend from the inward surface of left-handed PV module connector 106L can be further appreciated in FIG. 2D. In various aspects of left-handed PV module connector 106L, either of curved arm 112 and ledge 114 can extend from about one inch to about twelve inches (1 in.-12 in.) from the inward surface of left-handed PV module connector 106L, or a length of any increment or gradient thereof. Further, latch assembly 108 can be seen alongside and increasing the lower-portion thickness of left-handed PV module connector 106L. For any given photovoltaic module 102, right-handed PV module connector 106R and left-handed PV module connector 106L mechanically coupled to photovoltaic module 102 can have curved arms 112 and ledges 114 that extend an equal distance inward toward the center of photovoltaic module 102.

Considered in combination, right-handed PV module connectors 106R and left-handed PV module connectors 106L have opposing ledge sections 114 configured to support the frame of photovoltaic module 102 from below. As seen above, both right-handed PV module connectors 106R and left-handed PV module connectors 106L have alignment projections 118 and latch assemblies 108 that, when right-handed PV module connectors 106R and left-handed PV module connectors 106L are attached to photovoltaic module 102, operate as pairs of engaging structures that serve to bias and in part balance the frame of photovoltaic module 102 on torque tube 104. In some aspects, alignment projections 118 can be considered to be rigid or static structures for coupling to torque tube 104, while latch assemblies 108 can be considered adjustable or dynamic structures for coupling to torque tube 104.

Figures 2E, 2F:
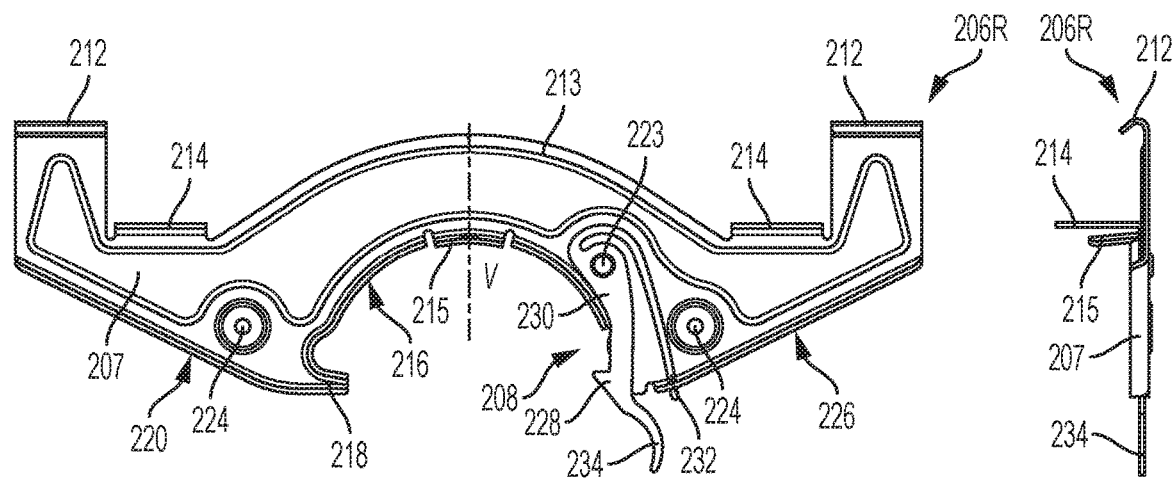
FIG. 2E shows a profile view of a right-handed photovoltaic module connector, according to alternative aspects of the disclosure.
FIG. 2F shows a side view of a right-handed photovoltaic module connector, according to alternative aspects of the disclosure.
Figures 2G, 2H:
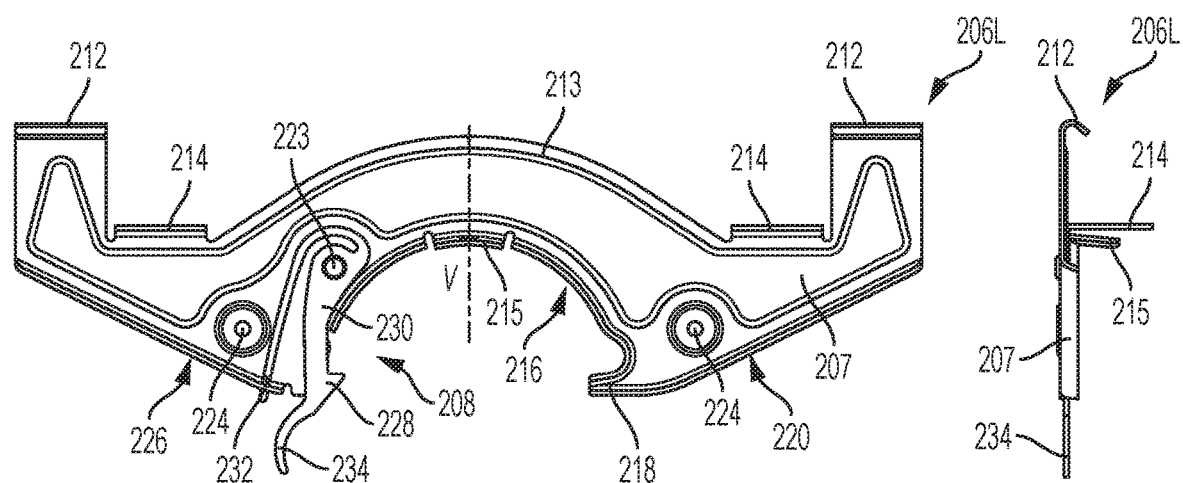
FIG. 2G shows a profile view of a left-handed photovoltaic module connector, according to alternative aspects of the disclosure.
FIG. 2H shows a side view of a left-handed photovoltaic module connector, according to alternative aspects of the disclosure.

FIGS. 2E and 2F show an alternative exemplary embodiment of right-handed PV module connector 206R, while FIGS. 2G and 2H show an alternative exemplary embodiment of left-handed PV module connector 206L. It can be understood that aspects of both right-handed PV module connector 206R and left-handed PV module connector 206L can be referred to in the general context of PV module connectors 206, and vice versa. It can be further understood that PV module connectors 206 can function in a similar manner as PV module connectors 106 discussed above.

FIG. 2E shows a profile view of right-handed PV module connector 206R. Right-handed PV module connector 206R can have a main body constructed to couple with and conform to components of photovoltaic array section 100. As shown, right-handed PV module connector 206R includes curved arm 212 sections and ledge sections 214 that extend from the inward surface of right-handed PV module connector 206R. Curved arm sections 212 can be located at opposite ends of right-handed PV module connector 206R with ledge sections 214 in between. Ledge sections 214 can be alternatively referred to as platforms, lateral supports, or inward support members. Curved arm sections 212 can be relatively higher than ledge sections 214 along the height of right-handed PV module connector 206R. Further, right-handed PV module connector 206R can include bridge 213 positioned between ledge sections 214, where bridge 213 can have an arched shape which can distribute load or further conform to components of photovoltaic array section 100. In alternative embodiments, right-handed PV module connector 206R can include a plurality of ledge sections 214 on one or either side of curved arm sections 212.

Both right-handed PV module connectors 206R and left-hand module connectors 206L can further include alignment projections 218 that provide for structural elements that can couple with holes in torque tube 104, thereby stabilizing photovoltaic modules 102 mounted to torque tube 104 via right-hand PV module connector 206R and left-hand module connector 206L. Further, both right-handed PV module connectors 206R and left-hand module connectors 206L can include contoured reinforcement 207, where in some aspects contoured reinforcement 207 can increase the thickness of PV module connector 206, for example by attaching (e.g. welded) an amount of metal and/or alloy onto the main body of PV module connector 206 (which can be either or both of the interior or exterior surface of PV module connector 206), and thereby proportionally increasing the strength of alignment the main body of PV module connector 206. In alternative aspects, contoured reinforcement 207 can be an additional amount of material attached onto the main body of PV module connector 206, where the additional material can be the same or a different metal or alloy as PV module connector 206.

Below bridge 213 formed in the main body of right-handed PV module connector 206R, is collar edge 216. As shown, collar edge 216 is faceted, however, it make take on other geometries. Collar edge 216 can be cut, cast, bent, or otherwise formed into the main body of right-handed PV module connector 206R to match with the shape of the exterior surface of torque tube 104. For example, where torque tube 104 is circular (forming a cylinder), collar edge 216 can have a semi-circular shape. The shape of collar edge 216 of any given PV module connector 206 can correspond to the shape of torque tube 104. One end of collar edge 216 can have alignment projection 218, where alignment projection 218 is arranged to extend relatively toward a central vertical axis V of right-handed PV module connector 206R, or in other words, toward the opposite end of collar edge 216.

Moreover, collar edge 216 of right-handed PV module connector 206R can be an intermittent or notched surface, such that gaps are present between regions of collar edge 216. Gaps or spaces between regions of collar edge 216 can allow for right-handed PV module connector 206R to more easily stretch over and conform to an exterior contour of torque tube 104. In some aspects, collar edge 216 can include fastening extension 215, where fastening extension 215 can extend from the inward surface of right-handed PV module connector 206R, and can provide for an additional structure by which right-handed PV module connector 206R can be secured to torque tube 104. In further aspects, collar edge 216 can have a width greater than the thickness of the main body of right-handed module connector 206R, collar edge 216 can in part form a flange.

Alignment projection 218 can be angled to point relatively toward, parallel to, or away from ledge sections 214. Further, alignment projection 218 can extend a distance from the main body of right-handed PV module connector 206R about one quarter of an inch (¼ in.), or about less than or equal to five percent (≤5%) of the width or diameter of collar edge 216. Alignment projection 218 can be formed from the main body of right-handed PV module connector 206R, being made of the same material. Alignment projection 218 can further be a reinforced structure, where in some aspects alignment projection 218 can be about twice as thick as the remainder of the main body of right-handed PV module connector 206R. The thickness of alignment projection 218 can be increased by adding material to the width of alignment projection 218 relative to the main body of right-handed PV module connector 206R, for example by doubling the amount of metal and/or alloy used for alignment projection 218, and thereby proportionally increasing the strength of alignment projection 218 relative to the main body of right-handed PV module connector 206R. In alternative aspects, the structure of alignment projection 218 can be reinforced with an additional amount of material attached (e.g. welded) onto the main body of right-handed PV module connector 206R, where the additional material can be the same or a different metal or alloy as right-handed PV module connector 206R. Alignment projection 218 can be configured to couple with receiving holes in torque tube 104, discussed in further detail below.

Right-handed PV module connector 206R can further include first surface 220 (alternatively referred to as a leading edge or primary ramp), defining in part a lower edge of the main body of right-handed PV module connector 206, on the same side as alignment projection 218 relative to collar edge 216. Similarly, right-handed PV module connector 206R can further include second surface 226 (alternatively referred to as a trailing edge or a secondary ramp), defining in part a lower edge of the main body of right-handed PV module connector 206R, on the opposite side as alignment projection 218 relative to collar edge 216. Both first surface 220 and second surface 226 can have a width greater than the thickness of the main body of right-handed module connector 206R, such that both first surface 220 and second surface 226 can in part form a flange.

Each of first surface 220 and second surface 226 can have an angle relative to ledge sections 214 (or in other words, relative to the horizontal plane on which photovoltaic module 102 rests when coupled to right-handed PV module connector 206) that is from about five degrees to about sixty degrees ($\theta=5°-60°$). This angle for either of first surface 220 and second surface 226 can be in part determined by the length of right-handed PV module connector 206R, and can further in part be determined by the amount of structural support needed for various photovoltaic modules 102 (e.g. photovoltaic modules 102 having different numbers of photovoltaic cells, weights, and/or lengths).

Right-handed PV module connector 206R can further include spring latch 208 (alternatively referred to as a flat torsion spring, a folded leaf spring, a ratchet spring, or a hairpin spring), positioned along collar edge 216 on a side opposite of alignment projection 218. Spring latch 208 can include notch 228, pawl arm 230, anchor arm 232, and leverage arm 234, where spring latch 208 is connected to right-handed PV module connector 206R via anchor arm 232 fitting into an aperture in second surface 226. Spring latch 208 can have a default or baseline position such that pawl arm 230 and notch 228 are urged toward a central vertical axis V of right-handed PV module connector 206R, or in other words, toward the opposite end of collar edge 216. In some aspects, spring latch 208 can have a thickness that is about the same as the thickness of the main body of right-handed PV module connector 206R or of contoured reinforcement 207. Spring latch 208 can be coupled to right-handed PV module connector 206R by fastener 223 that passes through the main body of right-handed PV module connector 206R. In combination, anchor arm 232 and fastener 223 can hold spring latch 208 in place alongside right-handed PV module connector 206R such that pawl arm 230 can be restorably moved to and from a position tracking or flush with collar edge 216. Leverage arm 234 of spring latch 208 can extend below the main body and provide for a gripping member such that pawl arm 230 can be pulled away from a default or baseline position. Leverage arm 234 can further be curved or articulated such that leverage arm is accessible for manipulation. When leverage arm 234 is released, pawl arm 230 would restore to a default or baseline position.

Spring latch 208 of right-handed PV module connector 206R can be made of the same material or a different material as the main body of right-handed PV module connector 206R. In some aspects, spring latch 208 can be constructed from a relatively stronger or harder metal or alloy than used for the main body of right-handed PV module connector 206R. Spring latch 208 can be positioned on the interior side of right-handed PV module connector 206R, or in other words, on the side of right-handed PV module connector 206R configured to face and support photovoltaic module 102.

The length of right-handed PV module connector 206R, in some embodiments, can be from about two hundred millimeters to about one thousand millimeters (200 mm-1000 mm), or a length of any increment or gradient thereof. The length of right-handed PV module connector 206R, in some particular embodiments, can be about four hundred millimeters (400 mm).

FIG. 2F shows a side view of right-handed PV module connector 206R. The extent to which curved arm 212, ledge portions 214, and fastening extension 215 generally extend from the inward surface of right-handed PV module connector 206R can be further appreciated in FIG. 2F. In various aspects of right-handed PV module connector 206R, any of curved arm 212, ledge portions 214, and fastening extension 215 can extend from about one inch to about twelve inches (1 in.-12 in.) from the inward surface of right-handed PV module connector 206R, or a length of any increment or gradient thereof. Further, leverage arm 234 of spring latch 208 can be seen alongside and extending below the main body of right-handed PV module connector 206R.

FIG. 2G shows a profile view of left-handed photovoltaic module connector 206L, which, similarly to right-handed PV module connector 206R, can have a main body constructed to couple with and conform to components of photovoltaic array section 100. Left-handed PV module connector 206L includes curved arm 212 sections and ledge sections 214 that extend from the inward surface of left-handed PV module connector 206L. Curved arm sections 212 can be located at opposite ends of left-handed PV module connector 206L with ledge sections 214 in between. Curved arm sections 212 can be relatively higher than ledge sections 214 along the height of left-handed PV module connector 206L. Further, left-handed PV module connector 206L can include bridge 213 positioned between ledge sections 214, where bridge 213 can have an arched shape which can distribute load or further conform to components of photovoltaic array section 100. In alternative embodiments, left-handed PV module connector 206L can include a plurality of ledge sections 214 on one or either side of curved arm sections 212. For any given photovoltaic module 102, right-handed PV module connector 206R and left-handed PV module connector 206L mechanically coupled to photovoltaic module 102 can have curved arms 212 and ledge sections 214 that mirror each other (having the same number and arrangement of curved arms 212 and ledge section 214) on opposing sides of photovoltaic module 102.

Below bridge 213, formed in the main body of left-handed PV module connector 206L, is collar edge 216. Collar edge 216 can be cut, cast, bent, or otherwise formed into the main body of left-handed PV module connector 206L to match with the shape of the exterior surface of torque tube 104, and accordingly can have the same shape as collar edge 216 of right-handed PV module connector 206R. One end of collar edge 216 can have alignment projection 218, where alignment projection 218 is arranged to extend relatively toward a central vertical axis V of left-handed PV module connector 206L, or in other words, toward the opposite end of collar edge 216.

Moreover, collar edge 216 of left-handed PV module connector 206L can be an intermittent or notched surface, such that gaps are present between regions of collar edge 216. Gaps or spaces between regions of collar edge 216 can allow for left-handed PV module connector 206L to more easily stretch over and conform to an exterior contour of torque tube 104. In some aspects, collar edge 216 can include fastening extension 215, where fastening extension 215 can extend from the inward surface of left-handed PV module connector 206L, and can provide for an additional structure by which left-handed PV module connector 206L can be secured to torque tube 104. In further aspects, collar edge 216 can have a width greater than the thickness of the main body of left-handed module connector 206L, collar edge 216 can in part form a flange Similar to right-handed PV module connector 206R, alignment projection 218 of left-handed PV module connector 206L can be angled to point relatively toward, parallel to, or away from ledge sections 214. Alignment projection 218 can extend a distance from the main body of left-handed PV module connector 206L about one quarter of an inch (¼ in.), or about less than or equal to five percent (≤5%) of the width or diameter of collar edge 216. Alignment projection 218 can be formed from the main body of left-handed PV module connector 206L, being made of the same material. Alignment projection 218 can further be a reinforced structure, where in some aspects alignment projection 218 can be about twice as thick as the remainder of the main body of left-handed PV module connector 206L. The thickness of alignment projection 218 can be increased by adding material to the width of alignment projection 218 relative to the main body of left-handed PV module connector 206L, for example by doubling the amount of metal and/or alloy used for alignment projection 218, and thereby proportionally increasing the strength of alignment projection 218 relative to the main body of left-handed PV module connector 206L. In alternative aspects, the structure of alignment projection 218 can be reinforced with an additional amount of material attached (e.g. welded) onto the main body of left-handed PV module connector 206L, where the additional material can be the same or a different metal or alloy as left-handed PV module connector 206L. Further, alignment projection 218 can be configured to couple with receiving holes in torque tube 104. In various aspects, alignment projections 218 on right-handed PV module connector 206R and left-handed PV module connectors 206L can be of the same or different construction and/or thicknesses.

Again mirroring right-handed PV module connector 206R, left-handed PV module connector 206L can further include first surface 220, defining a lower edge of the main body of left-handed PV module connector 206L, on the same side as alignment projection 218 relative to collar edge 216. Left-handed PV module connector 206L can further include second surface 226, defining in part a lower edge of the main body of left-handed PV module connector 206L, on the opposite side as alignment projection 218 relative to collar edge 216. Both first surface 220 and second surface 226 can have a width greater than the thickness of the main body of left-handed PV module connector 206L, such that both first surface 220 and second surface 226 can in part form a flange.

Each of first surface 220 and second surface 226 can have an angle relative to ledge sections 214 (or in other words, relative to the horizontal plane on which photovoltaic module 102 rests when coupled to left-handed PV module connector 206L) that is from about five degrees to about sixty degrees ($\theta=5°-60°$). This angle for either of first surface 220 and second surface 226 can be in part determined by the length of left-handed PV module connector 206L, and can further in part be determined by the amount of structural support needed for various photovoltaic modules 102 (e.g. photovoltaic modules 102 having different numbers of photovoltaic cells, weights, and/or lengths).

Left-handed PV module connector 206L can further include spring latch 208 positioned along collar edge 216 on a side opposite of alignment projection 218. Spring latch 208 can include notch 228, pawl arm 230, anchor arm 232, and leverage arm 234, where spring latch 208 is connected to left-handed PV module connector 206L via anchor arm 232 fitting into an aperture in second surface 226. Spring latch 208 can have a default or baseline position such that pawl arm 230 and notch 228 are urged toward a central vertical axis V of left-handed PV module connector 206L, or in other words, toward the opposite end of collar edge 216. In some aspects, spring latch 208 can have a thickness that is about the same as the thickness of the main body of left-handed PV module connector 206L or of contoured reinforcement 207. Spring latch 208 can be coupled to left-handed PV module connector 206L by fastener 223 that passes through the main body of left-handed PV module connector 206L. In combination, anchor arm 232 and fastener 223 can hold spring latch 208 in place alongside left-handed PV module connector 206L such that pawl arm 230 can be restorably moved to and from a position tracking or flush with collar edge 216. Leverage arm 234 of spring latch 208 can extend below the main body and provide for a gripping member such that pawl arm 230 can be pulled away from a default or baseline position. Leverage arm 234 can further be curved or articulated such that leverage arm is accessible for manipulation. When leverage arm 234 is released, pawl arm 230 would restore to a default or baseline position.

Spring latch 208 of left-handed PV module connector 206L can be made of the same material or a different material as the main body of left-handed PV module connector 206L. In some aspects, spring latch 208 can be constructed from a relatively stronger or harder metal or alloy than used for the main body of left-handed PV module connector 206L. Spring latch 208 can be positioned on the interior side of left-handed PV module connector 206L, or in other words, on the side of left-handed PV module connector 206L configured to face and support photovoltaic module 102. In various aspects, spring latch 208 that is a member of left-handed PV module connector 206L can be constructed from a metal or alloy that is as strong, stronger than, or not as strong as spring latch 208 that is a member of right-handed PV module connector 206R.

The length of left-handed PV module connector 206L, in some embodiments, can be from about two hundred millimeters to about one thousand millimeters (200 mm-1000 mm), or a length of any increment or gradient thereof. The length of left-handed PV module connector 206L, in some particular embodiments, can be about four hundred millimeters (400 mm). In various embodiments, right-handed PV module connectors 206R and left-handed PV module connectors 206L can be of the same or different lengths on any given photovoltaic module 102, or plurality of photovoltaic modules 102 as part of photovoltaic array section 100.

FIG. 2H shows a side view of left-handed PV module connector 206L. The extent to which curved arm 212, ledge sections 214, and fastener extension 215 generally extend from the inward surface of left-handed PV module connector 206L can be further appreciated in FIG. 2H. In various aspects of left-handed PV module connector 206L, either of curved arm 212, ledge sections 214, and fastener extension 215 can extend from about one inch to about twelve inches (1 in.-12 in.) from the inward surface of left-handed PV module connector 206L, or a length of any increment or gradient thereof. Further, spring latch 208 can be seen alongside and increasing the lower-portion thickness of left-handed PV module connector 206L. For any given photovoltaic module 102, right-handed PV module connector 206R and left-handed PV module connector 206L mechanically coupled to photovoltaic module 102 can have curved arms 212 and ledge sections 214 that extend an equal distance inward toward the center of photovoltaic module 102.

Considered in combination, right-handed PV module connectors 206R and left-handed PV module connectors 206L have opposing ledge sections 214 configured to support the frame of photovoltaic module 102 from below. As seen above, both right-handed PV module connectors 206R and left-handed PV module connectors 206L have alignment projections 218 and spring latches 208 that, when right-handed PV module connectors 206R and left-handed PV module connectors 206L are attached to photovoltaic module 102, operate as pairs of engaging structures that serve to bias and in part balance the frame of photovoltaic module 102 on torque tube 104. In some aspects, alignment projections 218 can be considered to be rigid or static structures for coupling to torque tube 104, while spring latches 208 can be considered adjustable or dynamic structures for coupling to torque tube 104.

In some aspects, both right-handed PV module connectors 206R and left-handed PV module connectors 206L can have supplemental apertures 224 that can accommodate additional fastening hardware. Supplemental apertures 224 can be located in the main body of PV module connectors 206 on opposing sides of collar edge 216, and can be configured to receive rivets, screws, hooks, or other connecting structures that can be components of photovoltaic array section 100.

Figure 3:
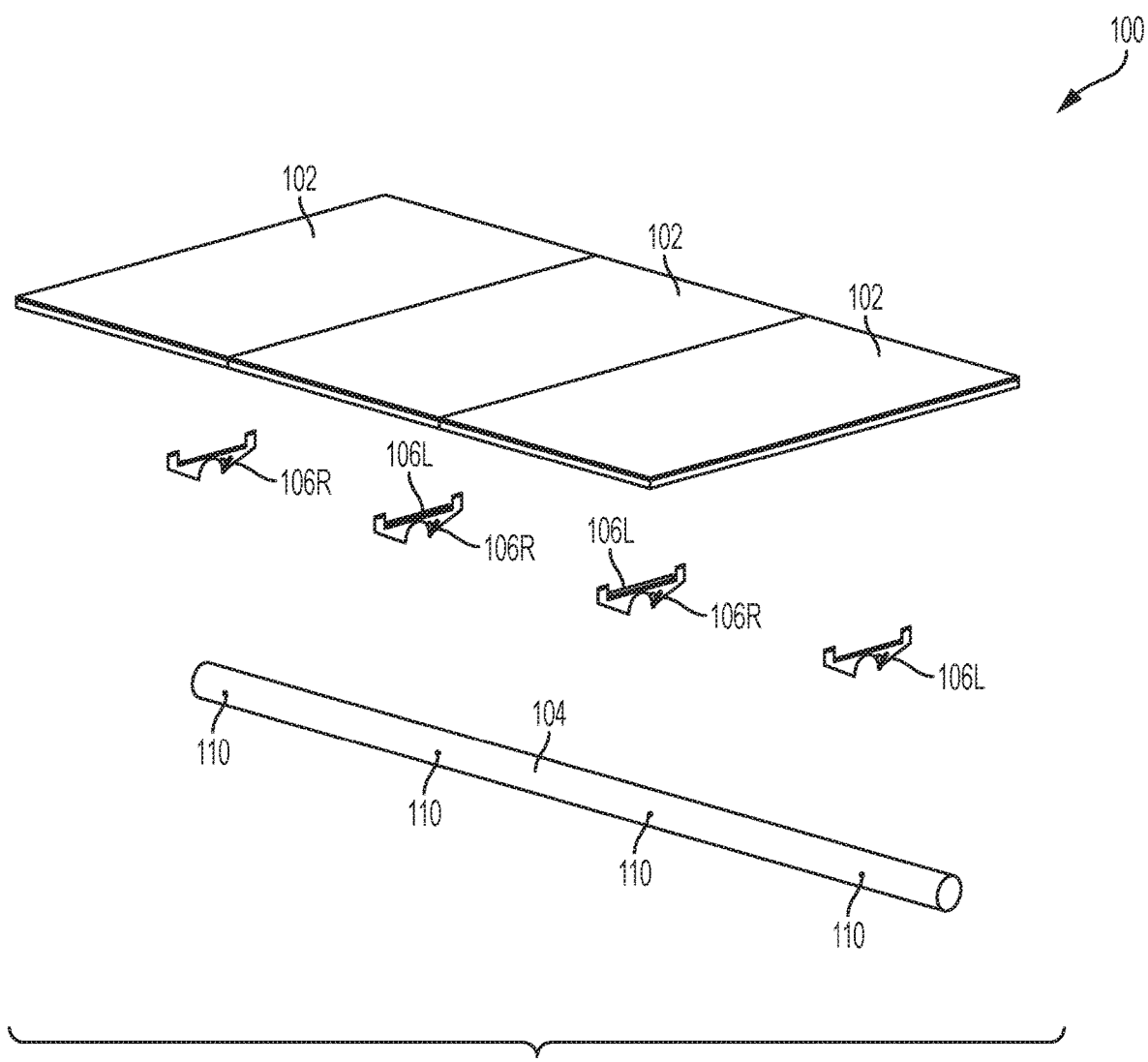
FIG. 3 shows an exploded view of FIG. 1, showing photovoltaic modules, photovoltaic module connectors, and a torque tube, according to embodiments of the disclosure.

FIG. 3 shows an exploded view of photovoltaic array section 100 from FIG. 1, further showing three sets of photovoltaic modules 102, right-handed PV module connectors 106R, and left-handed PV module connectors 106L, all positioned above torque tube 104. Torque tube 104 has receiving holes 110 (alternatively referred to as apertures) along the length of torque tube 104, positioned laterally proximate to the horizontal axis of symmetry of torque tube 104, and on both (opposing) sides of torque tube 104. As shown, alignment projections 118 of right-handed PV module connectors 106R and left-handed PV module connectors 106L can align with and fit or hook into receiving holes 110 seen on a proximate side of torque tube 104. Conversely, latch assemblies 108 of right-handed PV module connectors 106R and left-handed PV module connectors 106L can align with and fit or hook into receiving holes 110 on a distal side of torque tube 104. Generally, torque tube 104 is at least partially hollow, and receiving holes 110 can provide access to the interior of torque tube 104.

Accordingly, in an exemplary embodiment, an installer can mount fully assembled photovoltaic module 102 (i.e. photovoltaic module 102 with both right-handed PV module connector 106R and left-handed PV module connector 106L mechanically attached thereto) from the proximal or distal side of torque tube 104, sliding fully assembled photovoltaic module 102 along first edges 120 of right-handed PV module connector 106R and left-handed PV module connector 106L up onto torque tube 104 such that collar edges 116 of both right-handed PV module connector 106R and left-handed PV module connector 106L wrap around and settle on torque tube 104. Alignment projections 118 of right-handed PV module connector 106R and left-handed PV module connector 106L can then fit or hook into corresponding receiving holes 110, allowing photovoltaic module 102 to sit or balance on torque tube 104 until photovoltaic module 102 is more securely settled or attached to other components of photovoltaic array section 100. Subsequently, photovoltaic module 102 can be more securely attached to torque tube 104 by adjusting the position of photovoltaic module 102 such that portions of latch assemblies 108 of both right-handed PV module connector 106R and left-handed PV module connector 106L fit or hook into receiving holes 110 on the side of torque tube 104 opposite of receiving holes 110 that accommodate alignment projections 118. In other words, the portion of photovoltaic module 102 extending over the side of torque tube 104 opposite from the installer, balanced on torque tube 104 as a fulcrum, can exert a force as a load arm such that photovoltaic module 102 slides downward on opposite side of torque tube 104 until latch assemblies 108 align with and self-insert into receiving holes 110.

Alternatively, in an exemplary embodiment, an installer can mount fully assembled photovoltaic module 102 (i.e. photovoltaic module 102 with both right-handed PV module connector 106R and left-handed PV module connector 106L mechanically attached thereto) from the proximal or distal side of torque tube 104, sliding fully assembled photovoltaic module 102 along second edges 126 of right-handed PV module connector 106R and left-handed PV module connector 106L up onto torque tube 104 such that collar edges 116 of both right-handed PV module connector 106R and left-handed PV module connector 106L wrap around and settle on torque tube 104. Latch assemblies 108 of right-handed PV module connector 106R and left-handed PV module connector 106L can then fit or hook into corresponding receiving holes 110, allowing photovoltaic module 102 to sit or balance on torque tube 104 until photovoltaic module 102 is more securely settled or attached to other components of photovoltaic array section 100. Subsequently, photovoltaic module 102 can be more securely attached to torque tube 104 by adjusting the position of photovoltaic module 102 such that portions of alignment projections 118 of both right-handed PV module connector 106R and left-handed PV module connector 106L fit or hook into receiving holes 110 on the side of torque tube 104 opposite of receiving holes 110 that accommodate latch assemblies 108.

It can be understood that photovoltaic modules 102 can be mounted onto torque tube 104 from either or both of the proximal or distal side of torque tube 104, in a uniform, unidirectional, alternating, patterned, or irregular sequence or manner of orientation, as part of the process of forming longer photovoltaic array sections 100 and an overall photovoltaic array tracker.

Generally, torque tube 104 can be fabricated to include receiving holes 110 (alternatively referred to as mounting holes, apertures, openings, or alignment holes) along the length of torque tube 104 so that PV module connectors 106 (including right-handed PV module connectors 106R and left-handed PV module connectors 106L, but also including other PV module connectors generally, such as brackets) may be used to attach several photovoltaic modules 102 to torque tube 104. In various embodiments, torque tube 104 can be fabricated to include receiving holes 110 along the length of torque tube 104 so that PV module connectors 106 can be used to attach several photovoltaic modules 102 on or from the same side of torque tube 104, or on or from alternating sides of torque tube 104.

Collar edges 116 of both right-handed PV module connectors 106R and left-handed PV module connectors 106L can be shaped to fit onto torque tube 104 such that, when mechanically coupled together, a preload tension or force between PV module connectors 106 and torque tube 104 hold photovoltaic modules 102 in place, balanced on torque tube 104. The preload tension between collar edge 116 and torque tube 114 can be engineered according to the shape and size (e.g. width, diameter, angles, etc.) of collar edge 116 relative to the exterior surface of torque tube 104. More precisely, the size and shape of collar edge 106 can be slightly smaller than the corresponding exterior surface of torque tube 104, such that to fit onto torque tube 104, a respective PV module connector (either right-handed PV module connectors 106R or left-handed PV module connectors 106L) must expand a degree past a default shape of the PV module connector so that collar edge 106 can settle onto or around a portion of torque tube 104. It can be further understood that the restoring force of each PV module connector can be translated into torque tube 104 through alignment projections 118. The preload tension between collar edge 116 and torque tube 114 can be designed to be sufficient to hold one photovoltaic module 102, or one or more photovoltaic modules 102 mechanically connected to each other, on torque tube 104, absent other external forces. Once mounted, one or more photovoltaic modules 102 can be further secured to each other or torque tube 104 in order to supplement the preload force and overall stability of photovoltaic array section 100.

In optional embodiments, an additional end bracket (not shown) can be positioned next to PV module connectors 106 at extreme ends of photovoltaic array section 100 for additional stability. Such an end bracket can be used to aid in securing any given PV module connector at the North or South ends of photovoltaic array section 100 to torque tube 104. End bracket can have a generally similar shape as PV module connectors 106 considered herein, optionally with or without or curved arm sections 112 ledge sections 114. In some aspects, end brackets can have flush interior and/or exterior surfaces. In other aspects, end brackets can be configured to specifically terminate the ends or sides of photovoltaic array section 100.

Figure 4:
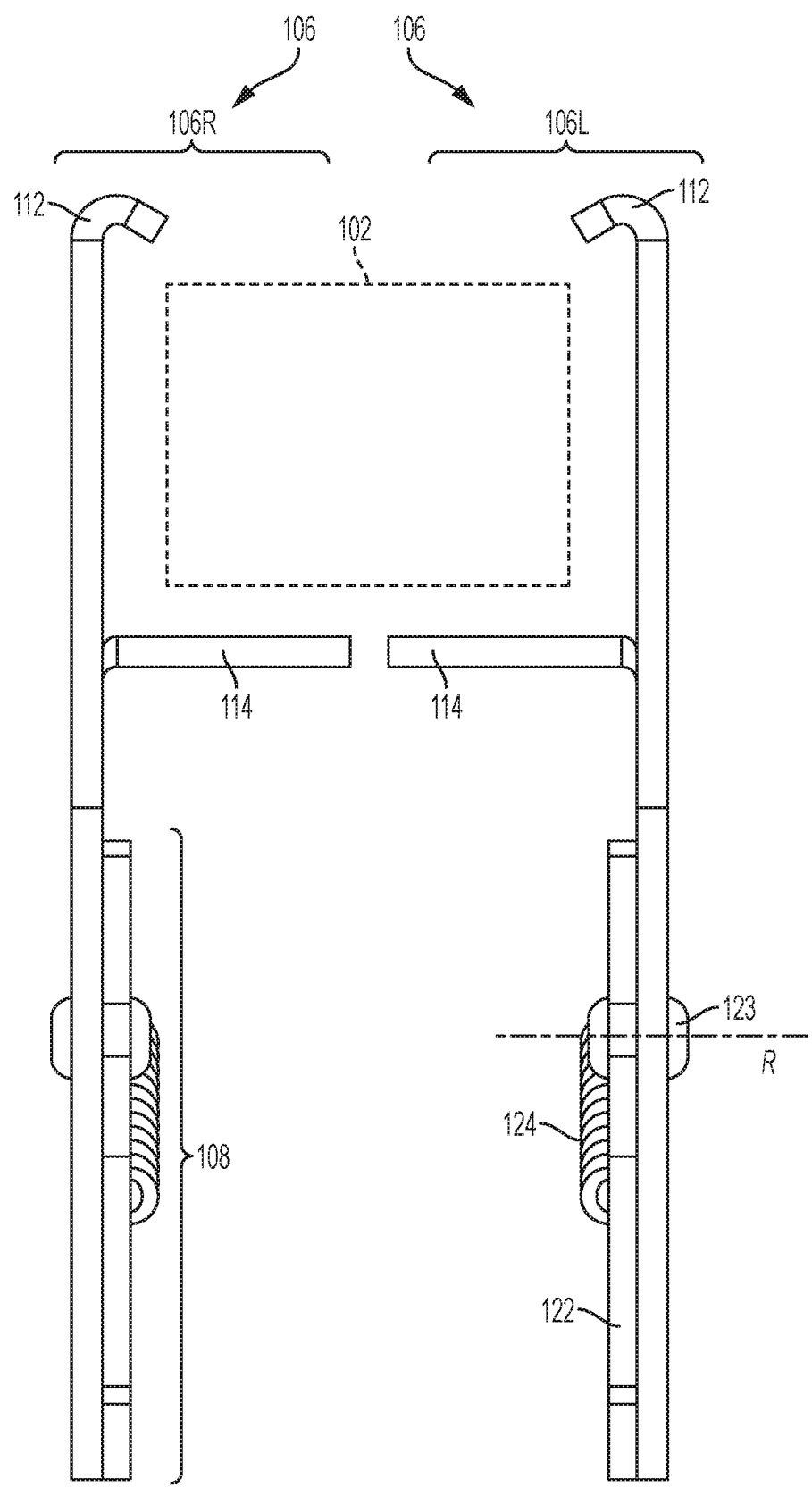
FIG. 4 shows a side view schematic of a pair of photovoltaic module connectors coupled to a photovoltaic module, according to embodiments of the disclosure.

FIG. 4 shows a side view schematic of paired of photovoltaic module connectors 106 coupled to photovoltaic module 102. More specifically, right-handed PV module connector 106R and left-handed PV module connector 106L are shown with pawls 122 facing the direction in which spring 124 applies force on pawls 122. In other words, pawls 122 are shown facing the opposite side of collar edge 116 to which they are attached. Further shown is an exemplary arrangement of latch assembly 108 as positioned below ledge section 114 of photovoltaic module connectors 106, with headed pin 123 passing through the main body of each photovoltaic module connector 106 respectively. As shown, headed pin 123 can define an axis of rotation R around which pawl 122 can pivot, where headed pin 123 can be positioned in the main body of PV module connector 106 at a height about even with where spring 124 is anchored to the main body of PV module connector 106. Photovoltaic module 102 (reduced in width for the purposes of the illustration) is shown positioned between ledge sections 114 and curved arms 112 of both right-handed PV module connector 106R and left-handed PV module connector 106L. Photovoltaic module 102 can rest on the platforms formed by ledge sections 114 on either side of photovoltaic module 102, and can further be held or clamped in a supported position by curved arms 112 also on either side of photovoltaic module 102.

In optional embodiments, PV module connectors 106 can support photovoltaic module 102 without structural elements biased toward one side of PV module connector 106 or the other. For example, PV module connector 106 can have flush surfaces above latch assembly 108, with one or more apertures for receiving fastening hardware. Photovoltaic module 102 can then be connected (e.g. bolted) on either side to PV module connectors 106. In another example, PV module connector 106 can have ledge sections 114 of equal length on either side of the main body of PV module connector 106 above latch assembly 108, without additional structure (e.g. a clamping curve section). Accordingly, photovoltaic modules 102 can rest on ledge sections 114 on either side of PV module connector 106.

In an alternative embodiment, PV module connectors 106 can be paired in opposing directions when coupled to photovoltaic module 102, such that alignment projection 118 of first PV module connector 106 and latch assembly 108 of second PV module connector 106 are positioned on one side of torque tube 104, and that alignment projection 118 of second PV module connector 106 and latch assembly 108 of first PV module connector 106 are positioned the opposing side of torque tube 104.

Figure 5A:
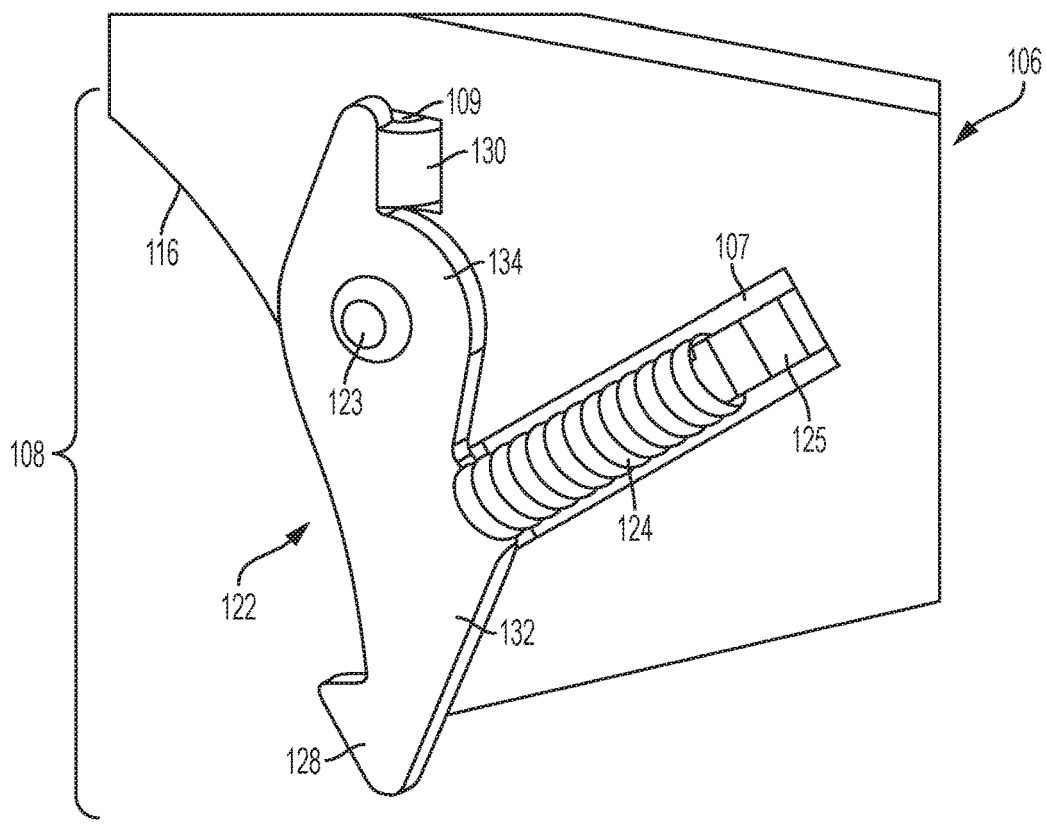
FIG. 5A shows a perspective view of a detail section of a photovoltaic module connector spring latch, according to embodiments of the disclosure.
Figure 5B:
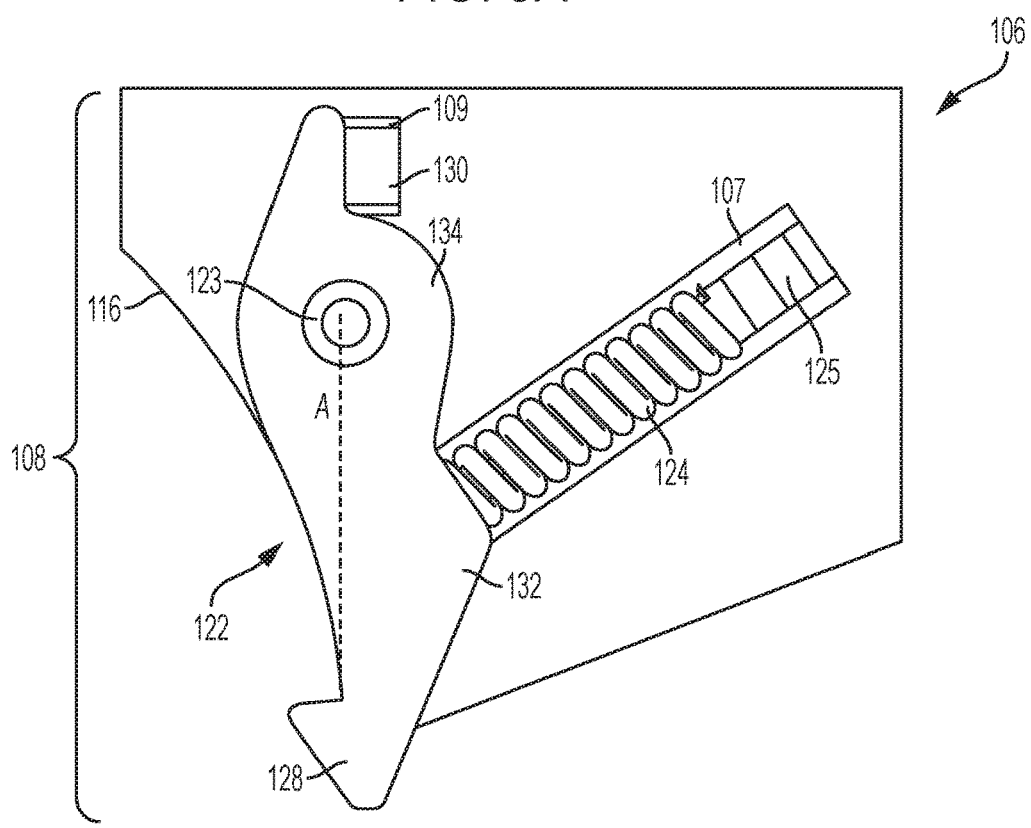
FIG. 5B shows a profile view of a detail section of a photovoltaic module connector spring latch, according to embodiments of the disclosure.

FIG. 5A shows perspective view of a detail section of PV module connector 106 having latch assembly 108. FIG. 5B shows profile view of the same detail section as in FIG. 5A of photovoltaic module connector 106 having pawl 122 and spring 124 of latch assembly 108. Shown in further detail are notch 128, stopper 130, lever region 132, and fulcrum region 134 of pawl 122. Pawl 122, mechanically supported on PV module connector 106 by headed pin 123, is in physical contact with spring 124. Spring 124 is positioned within retracting region 107, and mechanically connected to PV module connector 106 via anchor 125. Anchor 125 can be formed of the same materials as pawl 122, or of the same materials as PV module connector 106. Retracting region 107 can be cut or formed into the main body of PV module connector 106, and provides a space for spring 124 to reside as well as space for a portion of pawl 122 to move when pivoting. In particular, fulcrum region 134 of pawl 122 can generally surround a portion of headed pin 123 and define the center of rotation for pawl 122. Lever region 132 of pawl 122 can be in direct contact with spring 124 and can be the portion of pawl 122 on which spring 124 exerts force. In some aspects, lever region 132 can have a relatively small projection or stub that extends a distance up into the center of spring 124 (where spring 124 is a coil spring), securing spring 124 between lever region 132 and anchor 125.

Notch 128 (alternatively referred to as a secondary attachment tab, alignment extension, hook, or the like), can extend out from pawl 122 forming a flat surface or projection. Notch 128, generally formed below or proximate to lever region 132, can be configured to fit within receiving holes 110 of torque tube 104. In some aspects, as compared to alignment projection 118 (where alignment projection is on the other side of collar edge 116 effectively opposite to notch 128), notch 128 can have a similar shape and strength. In other aspects, as compared to alignment projection 118, notch 128 can have a greater structural strength than alignment projection 118, and can therefore extend a relatively longer distance inward than alignment projection 118. Accordingly, when PV module connector 106 is mounted on torque tube 104 and both alignment projection 118 and notch 128 are inserted into receiving holes 110 (on opposite sides of torque tube 104), notch 128 can extend into torque tube 104 a greater distance than alignment projection 118. The size and length of notch 128 can contribute to the overall strength and security of PV module connector 106 as mounted onto torque tube 104. In some aspects, notch 128 pawl can extend a distance from the main portion of pawl 122 (and my extension, from the main body of PV module connector 106) about one quarter of an inch to about one inch (¼ in.-1 in.), or about less than or equal to fifteen percent (≤15%) of the width or diameter of collar edge 116.

Pawl 122 can further include stopper 130, general formed above or proximate to fulcrum region 134, where stopper 130 is shaped to fit or pass into aperture 109 formed within the main body of PV module connector 106. Stopper 130 can operate as a brake to a pivoting motion of pawl 122 about headed pin 123 as driven by the force of spring 124. Stopper 130 allows for a specific and limited degree of freedom for rotation of pawl 122, where the size and shape of aperture 109 can be configured to block inward and outward rotation movements of stopper 130. In other words, as spring 124 urges lever region 132 of pawl 122 to rotate in an inward direction toward collar edge 116 (and thereby have fulcrum region 134 rotate in an outward direction away from collar edge 116), stopper 130 can be physically stopped by a side of aperture 109 once pawl 122 has rotated by a certain degree, thereby blocking further rotation of pawl 122 as a whole. Conversely, when pawl 122 is pulled or pushed to rotate such that notch 128 moves away from collar edge 116, stopper 130 can be physically stopped by an opposite side of aperture 109 once pawl 122 has rotated by a certain degree, again blocking further rotation of pawl 122 as a whole.

Pawl 122 can be formed and mounted on PV module connector 106 such that, in a resting or default position, headed pin 123 can be in line with the interface or transition between notch 128 and lever region 132, as shown in FIG. 5B by axis A. This arrangement of latch assembly 108 will not be unseated, back out, retract, or otherwise push away from receiving holes 110 of torque tube 104 when under load. In some aspects, notch 128 can be slightly tapered relative to axis A (or relative to the orientation of receiving holes 110), and in other aspects notch 128 can be slightly oversized relative to the size of receiving holes 110. Accordingly, notch 128 of pawl 122 can minimize or prevent rattling or other loose physical connections between PV module connector 106 and torque tube 104. Indeed, with such an arrangement, movement or struggle of PV module connector 106 on torque tube 104 can in fact tighten the joint between pawl 128 and receiving holes 110.

Figure 5C:
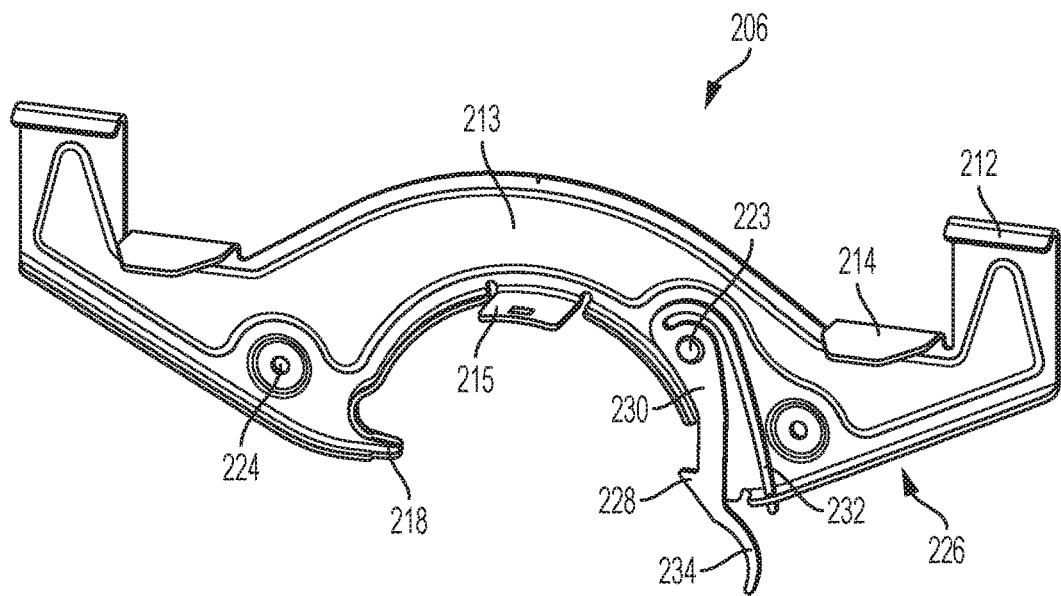
FIG. 5C shows a perspective view of an photovoltaic module connecter and spring latch, according to alternative embodiments of the disclosure.
Figure 5D:
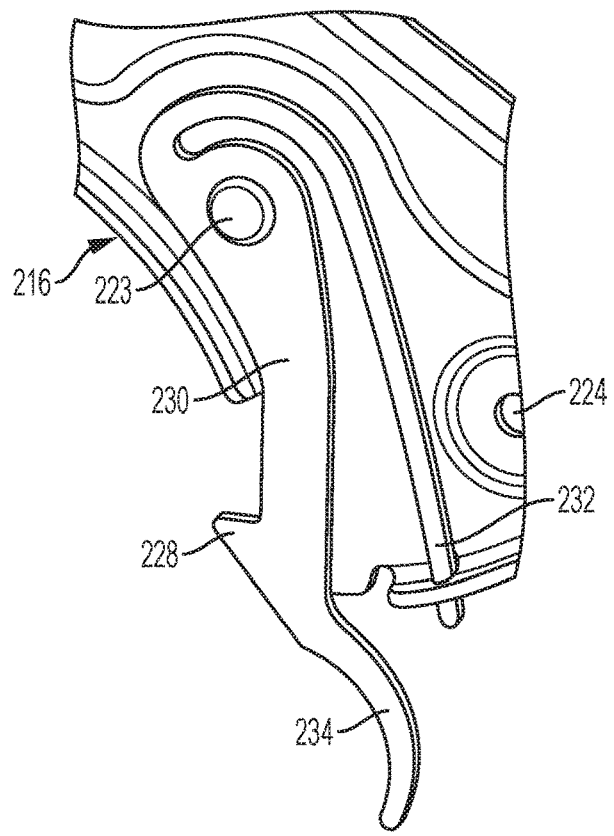
FIG. 5D shows a detail view of a section of a photovoltaic module connector spring latch, according to alternative embodiments of the disclosure.

FIG. 5C shows a perspective view of photovoltaic module connecter 206 and spring latch 208. FIG. 5D shows a detail view of FIG. 5C of a section of photovoltaic module connector 206 and spring latch 208. Shown in further detail are notch 228, pawl arm 230, anchor arm 232, fastener 223, and leverage arm 234. Anchor arm 232 is secured within an aperture of second surface 226 and fastener 223 secures spring latch 208 to the main body of photovoltaic module connecter 206. Accordingly, movement of pawl arm 230, for example, by pulling leverage arm 234 away from the center of photovoltaic module connecter 206, can generate a spring force such that pawl arm 230 is urged back to a default or baseline position. Movement of pawl arm 230 away from the center of photovoltaic module connecter 206 leads top notch 228 to also move away from away from the center of photovoltaic module connecter 206, and can allow for photovoltaic module connecter 206 to fit around torque tube 104 (where collar edge 216 has a contour matching torque tube 104), such that notch 228 can insert and fit into a receiving hole 110 in torque tube 104. Notch 228 and alignment projection 218 can fit into receiving holes 110 on opposite sides of torque tube 104 at generally equal lateral positions along torque tube 104.

Further shown in fastening extension 215 is an aperture, through which additional mounting hardware can pass to secure photovoltaic module connecter 206 to torque tube 104.

Figure 6A:
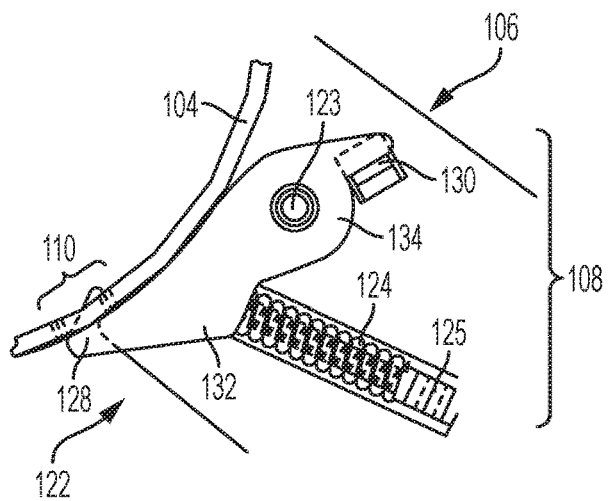
FIG. 6A shows a schematic of a photovoltaic module connector spring latch engaged with a torque tube, according to embodiments of the disclosure.

FIG. 6A shows a schematic of latch assembly 108 engaged with torque tube 104. Shown in further detail is notch 128 of pawl 122 extending into and passing through receiving hole 110 of torque tube 104. Spring 124 held by anchor 125 to PV module connector 106 exerts a force on lever region 132. Pawl 122, having rotated around headed pin 123, is in physical contact with the exterior of torque tube 104. It is appreciated that PV module connector 106 may need to be disconnected from torque tube 104, in order to dismount or remove photovoltaic modules 102 from photovoltaic array section 100. Thus, latch assembly 108 can be further used to release that PV module connector 106 from torque tube 104. In some aspects, stopper 130 can be urged toward torque tube 104, thereby rotating fulcrum region 134 of pawl 122 about header pin 123 and withdrawing notch 128 from receiving hole 110 and allowing an operator to pull PV module connector 106 away from torque tube 104. In other aspects, notch 128 or lever region 132 can be pulled on to withdraw notch 128 from receiving hole 110.

Figure 6B:
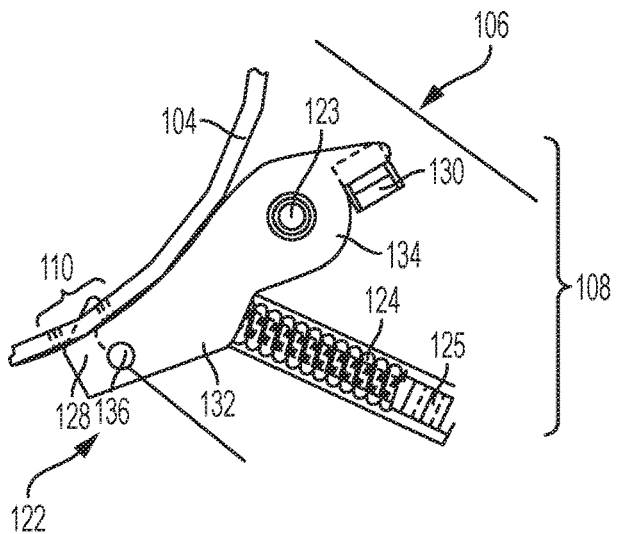
FIG. 6B shows a schematic of a photovoltaic module connector spring latch, having an aperture, engaged with a torque tube, according to embodiments of the disclosure.

FIG. 6B shows a schematic of latch assembly 108 engaged with torque tube 104, latch assembly 108 further having tool aperture 136. Tool aperture 136 provides for an alternative approach to decoupling pawl 122 from torque tube 104. An operator can insert a general tool, a specialized tool, or an appendage into tool aperture 136 and exert a force in a direction to withdraw notch 128 out of receiving hole 110. The ability to connect a tool via tool aperture 136 allows for a stronger pulling force that can be applied, as compared to pawl 122 without tool aperture 136.

Figure 6C:
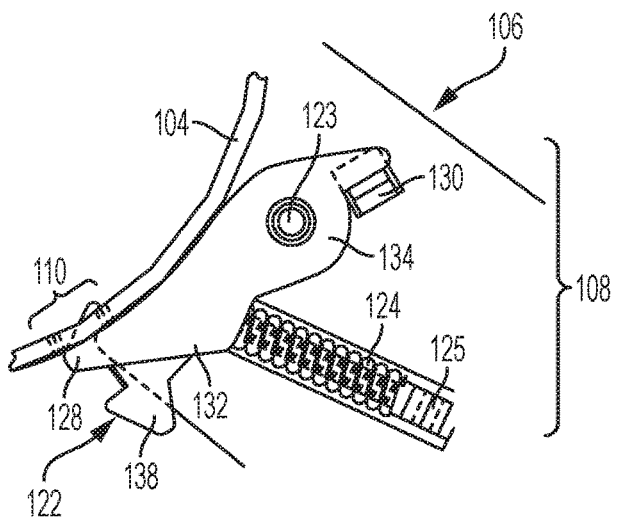
FIG. 6C shows a schematic of a photovoltaic module connector spring latch, having an extension, engaged with a torque tube, according to embodiments of the disclosure.

FIG. 6C shows a schematic of latch assembly 108 engaged with torque tube 104, latch assembly 108 further having release extension 138. Release extension 138 provides for a further alternative approach to decoupling pawl 122 from torque tube 104. An operator can manually, or with a tool, grip release extension 138 and exert a force in a direction to withdraw notch 128 out of receiving hole 110. The greater surface area of release extension 138 provides for a relatively larger area to grip by which force can be applied, as compared to pawl 122 without release extension 138.

Figure 7:
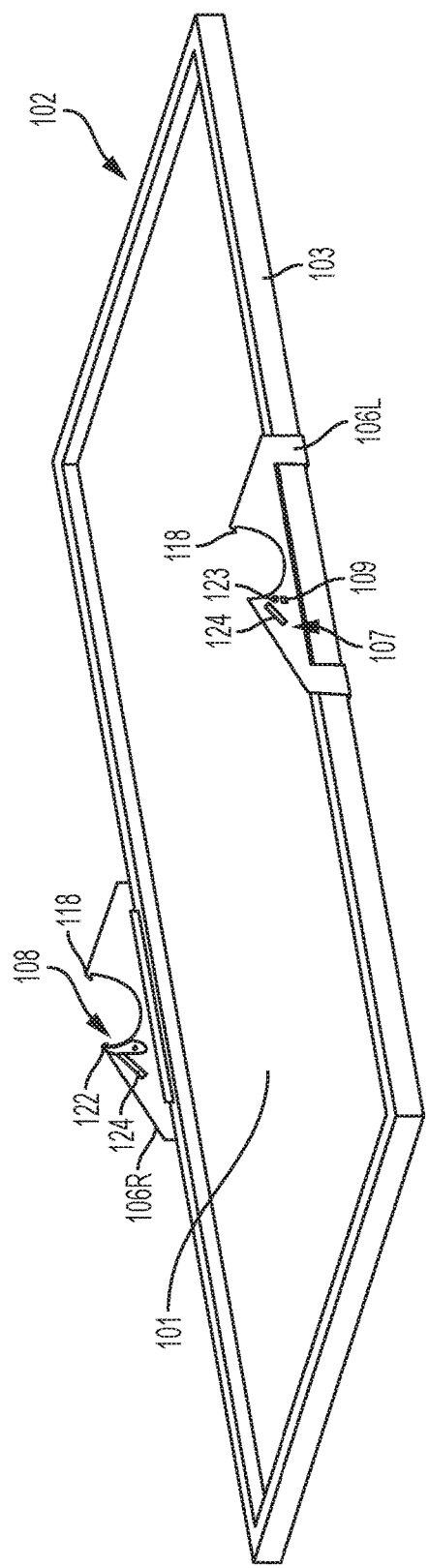
FIG. 7 shows the underside of a photovoltaic module with photovoltaic module connector mechanically coupled thereto, according to embodiments of the disclosure.

FIG. 7 shows the underside of photovoltaic module 102 with right-handed PV module connector 106R and left-handed PV module connector 106L mechanically coupled thereto. Shown in further detail are photovoltaic cells 101 arranged in a panel layout and module frame 103, holding photovoltaic cells 101 and thereby forming photovoltaic module 102. Both right-handed PV module connector 106R and left-handed PV module connector 106L have respective alignment projections 118 oriented in the same direction. Similarly, both right-handed PV module connector 106R and left-handed PV module connector 106L have respective latch assemblies 108 oriented in the same direction. Springs 124 in retracting regions 107 can be seen for both right-handed PV module connector 106R and left-handed PV module connector 106L. Pawl 122 of right-handed PV module connector 106R is visible on the interior surface (i.e. the side facing toward photovoltaic module 102) of right-handed PV module connector 106R. Aperture 109 and headed pin 123 of left-handed PV module connector 106L are visible on the exterior surface (i.e. the side facing away from photovoltaic module 102) of left-handed PV module connector 106L.

In various embodiments, module frame 103 can be a standard frame with smooth edges or a frame having a structured groove therein that can allow for mechanical coupling with grooved-frame support structures. A junction box (not shown) can be electrically connected to photovoltaic cells 101 and physically attached to photovoltaic module 102 (in an appropriate orientation) when mounted onto torque tube 104. Junction boxes from a plurality of photovoltaic modules 102 can electrically connected to each other in series or in parallel as part of photovoltaic array section 100.

Figure 8:
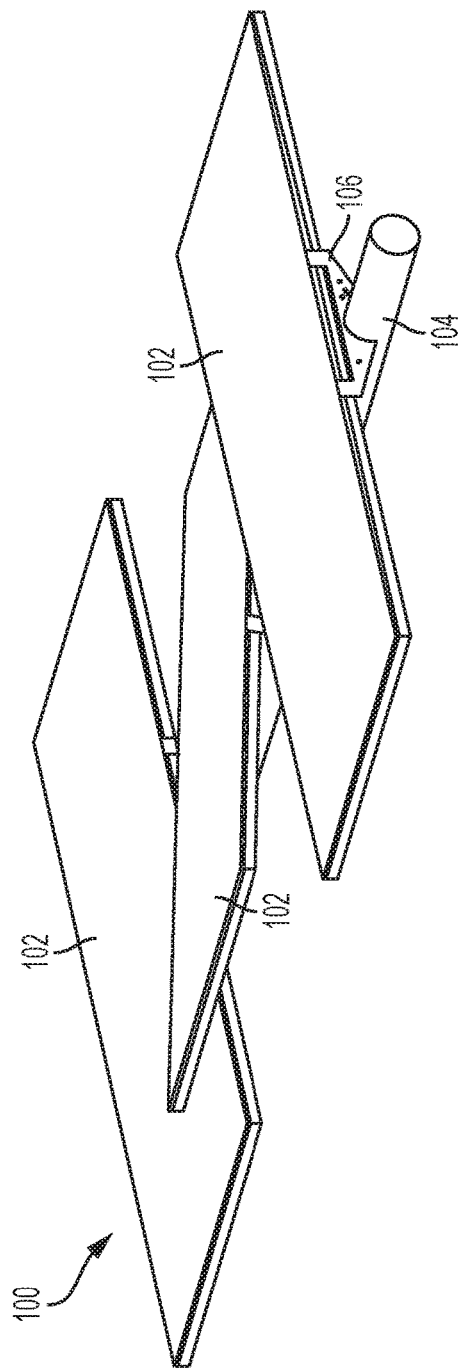
FIG. 8 shows a section of a photovoltaic array with photovoltaic modules mounted to a torque tube with photovoltaic module connectors, according to aspects of the disclosure.

FIG. 8 shows photovoltaic array section 100 of FIG. 3, with photovoltaic modules mounted to torque tube 104 with PV module connectors 106. From the angle of the representation, only left-handed PV module connectors can be seen in FIG. 8, but it can be easily understood that both left-handed and right-handed PV module connectors can be used to mount photovoltaic modules 102 to torque tube 104. Photovoltaic modules 102 are shown at an intermediate stage of assembly and installation onto torque tube 104, where photovoltaic modules 102 are not yet settled into a substantially even and uniform plane (similar to, but at an earlier stage of assembly than, FIG. 1).

FIG. 9 shows a profile view of PV module connector 106 attached to photovoltaic module 102 and engaged with torque tube 104 via latch assembly 108. Curved arms 112 can be seen on top of photovoltaic module 102 securing photovoltaic module 102 to PV module connector 106. FIG. 9A shows a detail section of FIG. 9, further illustrating latch assembly 108 of PV module connector 106. Both alignment projection 118 and pawl 122 can be seen in further detail extending into the interior space of torque tube 104, holding PV module connector 106 to torque tube 104. Spring 124 and anchor are shown residing within retracting region 107, with spring 124 exerting force on pawl 122, holding pawl 122 against torque tube 104. FIG. 9B shows a detail section of FIG. 9 (without torque tube 104), further illustrating a perspective view of the latch assembly 108 of PV module connector 106. Collar edge 116 is shown, with a curvature of pawl 122 matching a curvature of collar edge 116, as appropriate to match and frictionally interface with torque tube 104, until reaching notch 128, where notch 128 is configured to extend into an opening of torque tube 104. Aperture 109 and stopper 130 are also shown, in a position relatively higher up on the main body of PV module connector 106 relative to spring 124 and header pin 123.

FIG. 9C further shows preload forces exerted by PV module connector 106 mounted onto torque tube 104, according to some embodiments of the present disclosure. Specifically, because collar edge 116 of PV module connector 106 is forcibly stretched over the outer surface of torque tube 104, PV module connector 106 exerts forces to torque tube 104 via both alignment projection 118 and notch 128 of pawl 122. Alignment projection 118 of right-handed PV module connector 106 is physically latched into torque tube 104, generating first force 119 that is tangential to torque tube 104, resulting in a clockwise moment about torque tube 104. Similarly, notch 128 is physically latched into torque tube 104, generating second force 129 that is also tangential to torque tube 104, resulting in a counterclockwise moment about torque tube 104. Generally, as part of the same PV module connector 106, first force 119 and second force 129 are counter-balanced, offsetting each other. In other words, moments exhibited to torque tube 104 by the forces are neutralized and in between alignment projection 118 and notch 128 (e.g. in the center of torque tube 104). Spring force 121 is also shown, applied from spring 124 on pawl 122, helping to maintain notch 128 in place against any portion of second force 129 that may otherwise urge notch 128 to disengage from torque tube 104.

Figure 10:
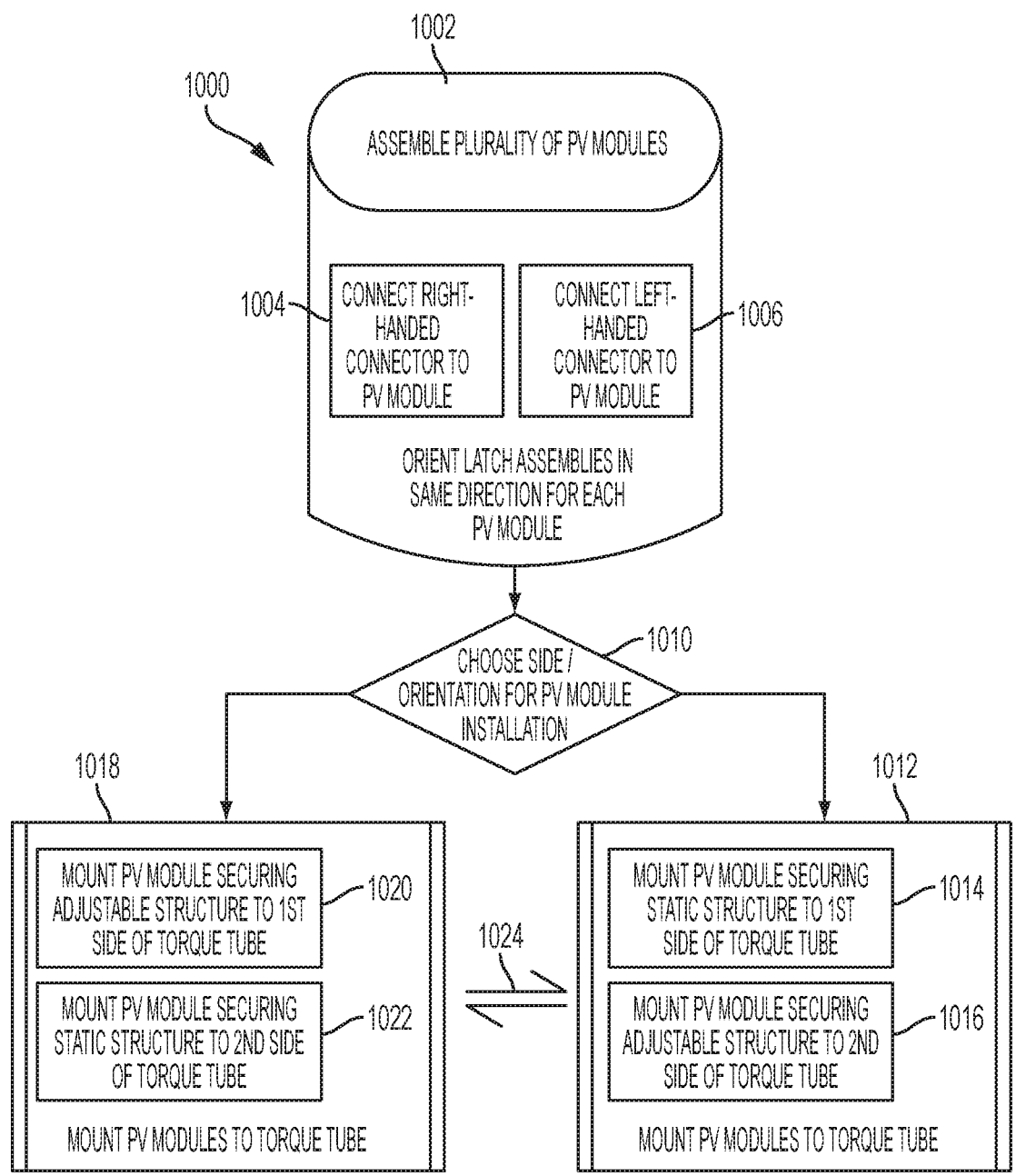
FIG. 10 shows an exemplary flowchart describing a method of assembling a photovoltaic array, according to embodiments of the disclosure.

FIG. 10 shows an exemplary flowchart 1000 describing a method of assembling a photovoltaic array. At step 1002, a plurality of PV modules are assembled. Assembly of each PV module includes step 1004, connecting a right-handed connector to the PV module and step 1006, connecting a left-handed connector to the PV module. Both of the right-handed connector and the left-handed connector are oriented such that latch assemblies on each connector (and their respective notches) are pointing in the same direction on a given PV module. Similarly, both of the right-handed connector and the left-handed connector are oriented such that static or rigid attachment tabs on each connector are pointing in the same direction on a given PV module, opposite the direction of the dynamic and adjustable latch assemblies. Assembly of the plurality of PV modules can further include connecting a junction box to the underside of each PV module.

At step 1010, a decision can be made to choose which from side of a torque tube PV modules are mounted, and in which orientation the PV modules will be mounted. This decision determines whether the rigid attachment structures (e.g. alignment projections) or the adjustable attachment structures (e.g. spring latches) are inserted first into respective openings in the torque tube.

At step 1012, a photovoltaic module is oriented such that, at step 1014, the photovoltaic module can be slid or otherwise positioned onto the torque tube, and the rigid attachment structures of the PV module connectors are inserted into openings of the torque tube. More specifically, each PV module is pivoted in at an angle and pressed down to such that the collar portion of the PV module connectors rest and frictionally interface with the torque tube, and such that rigid attachment tabs insert or hook into orientation holes in the torque tube. At step 1016, the photovoltaic module can then be moved, settled, or rotated such that the PV module connectors fit over the exterior surface of the torque tube and the adjustable attachment structures of the PV module connectors are inserted into openings on the opposite side of the torque tube. The process of step 1012 can be repeated for a portion of or the entirety of assembling a section of a photovoltaic array as part of a solar tracker.

At step 1018, a photovoltaic module is oriented such that, at step 1020, the photovoltaic module can be slid or otherwise positioned onto the torque tube, and the adjustable attachment structures of the PV module connectors are inserted into openings of the torque tube. More specifically, each PV module is pivoted in at an angle and pressed down to such that the collar portion of the PV module connectors rest and frictionally interface with the torque tube, and such that adjustable attachment tabs insert or hook into orientation holes in the torque tube. At step 1022, the photovoltaic module can then be moved, settled, or rotated such that the PV module connectors fit over the exterior surface of the torque tube and the rigid attachment structures of the PV module connectors are inserted into openings on the opposite side of the torque tube. The process of step 1018 can be repeated for a portion of or the entirety of assembling a section of a photovoltaic array as part of a solar tracker.

It can be understood that, at step 1024, the orientation or side from which photovoltaic modules are mounted to a torque tube can be interchangeable. The side of the torque tube from which photovoltaic modules are mounted, or the orientation of the photovoltaic modules as mounted on the torque tube, can be chosen and alternated as most appropriate for the ease of a given installation (e.g. working around obstacles next to a solar tracker array, wiring junction boxes of adjacent photovoltaic modules together, etc.). Regardless of whether photovoltaic modules are mounted onto a torque tube according to the order of step 1012 or step 1018, the photovoltaic modules can be mounted such that, when the torque tube is rotated to a default orientation and the photovoltaic modules are correctly placed, the photovoltaic modules will sit substantially perpendicular to the ground. Moreover, the photovoltaic modules can form a generally uniform and even plane as part of the solar tracker array, helping to optimize the collection of solar energy by the solar tracker array.

In addition to tracker arrays, the brackets and/or clamps as disclosed herein can also be used for mounting PV modules in other types of PV installations, for example in fixed arrays. Such fixed arrays can include fixed tilt ground-based or roof-top mounting systems, where such systems can have individual or common tubular members to which the brackets and/or clamps can be used to attach PV modules.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, or gradients thereof, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. The invention is susceptible to various modifications and alternative constructions, and certain shown exemplary embodiments thereof are shown in the drawings and have been described above in detail. Variations of those preferred embodiments, within the spirit of the present invention, may become apparent to those of ordinary skill in the art upon reading the foregoing description. The inventors expect skilled artisans to employ such variations as appropriate, and the inventors intend for the invention to be practiced otherwise than as specifically described herein. Accordingly, it should be understood that there is no intention to limit the invention to the specific form or forms disclosed, but on the contrary, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A photovoltaic module connector system for a solar tracker array comprising:
    a first connector configured to mount to a torque tube and support a first side of a photovoltaic module, the first connector comprising a first alignment projection that protrudes into a first lateral side of the torque tube, and a first spring latch that protrudes into a second lateral side of the torque tube, opposing the first lateral side; and
    a second connector configured to mount to the torque tube and support a second side of the photovoltaic module, the second connector having a second alignment projection that protrudes into the first lateral side of the torque tube, and a second spring latch that protrudes into the second lateral side of the torque tube,
    wherein the first spring latch and the second spring latch both further comprise a pawl arm, wherein each pawl arm is configured to rotate between a first positon wherein a notch of the pawl arm does not extend into the second lateral side of the torque tube and a second position wherein the notch extends into the second lateral side of the torque tube, and
    wherein the pawl arm is spring biased to the second position.

2. The photovoltaic module connector system of claim 1, wherein the first connector is a right-handed connector and the second connector is a left-handed connector that mirrors the right-handed connector.

3. The photovoltaic module connector system of claim 2, wherein the right-handed connector and the left-handed connector each further comprises:
    a ledge section, extending from an interior surface and configured to support the photovoltaic module;
    at least one curved arm section, extending from the interior surface; and
    a collar edge shaped to fit around a portion of the torque tube.

4. The photovoltaic module connector system of claim 3, wherein each right-handed connector and each left-handed connector further comprises two curved arm sections having the ledge section positioned between the two curved arm sections.

5. The photovoltaic module connector system of claim 3, wherein the notch of the first spring latch and the notch of the second spring latch each protrude into the torque tube a distance greater than or equal to a distance that the alignment projections of the left-handed and right-handed connectors protrude into the torque tube.

6. The photovoltaic module connector system of claim 2, wherein the right-handed connector and the left-handed connector both apply counter balanced moments to the torque tube.

7. A photovoltaic module mount, comprising:
    a main body defining a first surface;
    a ledge section, extending from the first surface and configured to support a side of a photovoltaic module;

at least one curved arm section, extending from the first surface;

a collar edge configured to fit around and receive a portion of a torque tube;

an attachment tab extending from a first end of the collar edge and configured to extend into a first side of the torque tube received in the collar edge; and a spring latch located at a second end of the collar edge opposite from the attachment tab, wherein the spring latch is positioned within an aperture in the main body of the photovoltaic module mount, wherein the spring latch comprises a pawl arm pivotally coupled to the main body at a first end of the pawl arm and defining a notch at a second end of the pawl arm so that the pawl arm is rotatable between a first positon wherein the notch does not extend beyond the collar edge and a second position wherein the notch extends beyond the collar edge and is configured to be received into a second side of the torque tube received in the collar edge opposite the first side of the torque tube, and wherein pawl arm is spring biased to the second position.

8. The photovoltaic module mount of claim 7, wherein the spring latch further comprises a leverage arm and an anchor arm, wherein the leverage arm is configured to allow a user to pull the pawl arm from the second position toward the first position.

9. The photovoltaic module mount of claim 8, wherein the spring latch is mechanically coupled to the photovoltaic module mount via the anchor arm and a fastener.

10. The photovoltaic module mount of claim 8, wherein the photovoltaic module mount further comprises one or more supplementary apertures.

11. The photovoltaic module mount of claim 8, wherein the first surface of the photovoltaic module mount is configured to face the photovoltaic module.

12. The photovoltaic module mount of claim 8, further comprising a contoured reinforcement increasing a thickness of a region of the photovoltaic module mount.

13. The photovoltaic module mount of claim 8, further comprising a fastening extension extending from the first surface.

14. The photovoltaic module mount of claim 7, wherein the attachment tab is configured to protrude into an opening on a first lateral side of the torque tube, and a wherein the spring latch is configured to protrude into an opening on a second lateral side of the torque tube.

* * * * *